United States Patent
Matsuzaki et al.

(10) Patent No.: US 6,633,911 B1
(45) Date of Patent: Oct. 14, 2003

(54) INFORMATION DISTRIBUTION APPARATUS, INFORMATION DISTRIBUTION METHOD, AND COMPUTER READABLE RECORDING MEDIUM ON WHICH INFORMATION DISTRIBUTION PROGRAM IS RECORDED

(75) Inventors: Yuji Matsuzaki, Kanagawa (JP); Mitsuru Osawa, Kanagawa (JP); Atsushi Nishide, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/519,694

(22) Filed: Mar. 7, 2000

(30) Foreign Application Priority Data

Aug. 9, 1999 (JP) .......................... 11-225740

(51) Int. Cl.[7] .......................................... G06F 15/173
(52) U.S. Cl. ...................................... 709/224; 709/206
(58) Field of Search ........................ 395/200; 348/586; 709/224, 203, 200, 214, 223, 226, 202, 206

(56) References Cited

U.S. PATENT DOCUMENTS

| | | | | |
|---|---|---|---|---|
| 5,537,141 A | * | 7/1996 | Harper et al. ............... | 725/116 |
| 5,867,653 A | * | 2/1999 | Aras et al. ................... | 709/204 |
| 5,974,446 A | * | 10/1999 | Sonnenreich et al. ....... | 709/204 |
| 6,253,375 B1 | * | 6/2001 | Gordon et al. ................ | 725/88 |
| 6,268,849 B1 | * | 7/2001 | Boyer et al. ................. | 345/721 |
| 6,288,753 B1 | * | 9/2001 | DeNicola et al. ........... | 348/586 |
| 6,305,019 B1 | * | 10/2001 | Dyer et al. .................... | 725/91 |
| 6,343,314 B1 | * | 1/2002 | Ludwig et al. ............. | 709/204 |
| 6,437,818 B1 | * | 8/2002 | Ludwig et al. .......... | 348/14.09 |

FOREIGN PATENT DOCUMENTS

JP    8130714    5/1996

OTHER PUBLICATIONS

Pagani et al., "Providing reliable and fault tolerant broadcast delivery in mobile" ACM, 1999, pp. 175–192.*

* cited by examiner

Primary Examiner—Bunjob Jaroenchonwanit
(74) Attorney, Agent, or Firm—Greer, Burns & Crain, Ltd

(57) ABSTRACT

An information distribution apparatus generates streaming packets, that contain information which can be reproduced in real time, to be distributed to a plurality of receiving apparatuses. A distribution control unit inquires the receiving apparatuses, before starting the distribution, to decide whether they would like to accept the streaming packets. An accumulation control unit receives the replies from the receiving apparatuses and accumulates the number of replies. The distribution control unit starts or stops the distribution of the information on the basis of the number of replies accumulated in the accumulation control unit.

11 Claims, 16 Drawing Sheets

FIG.5A
FIG.5B

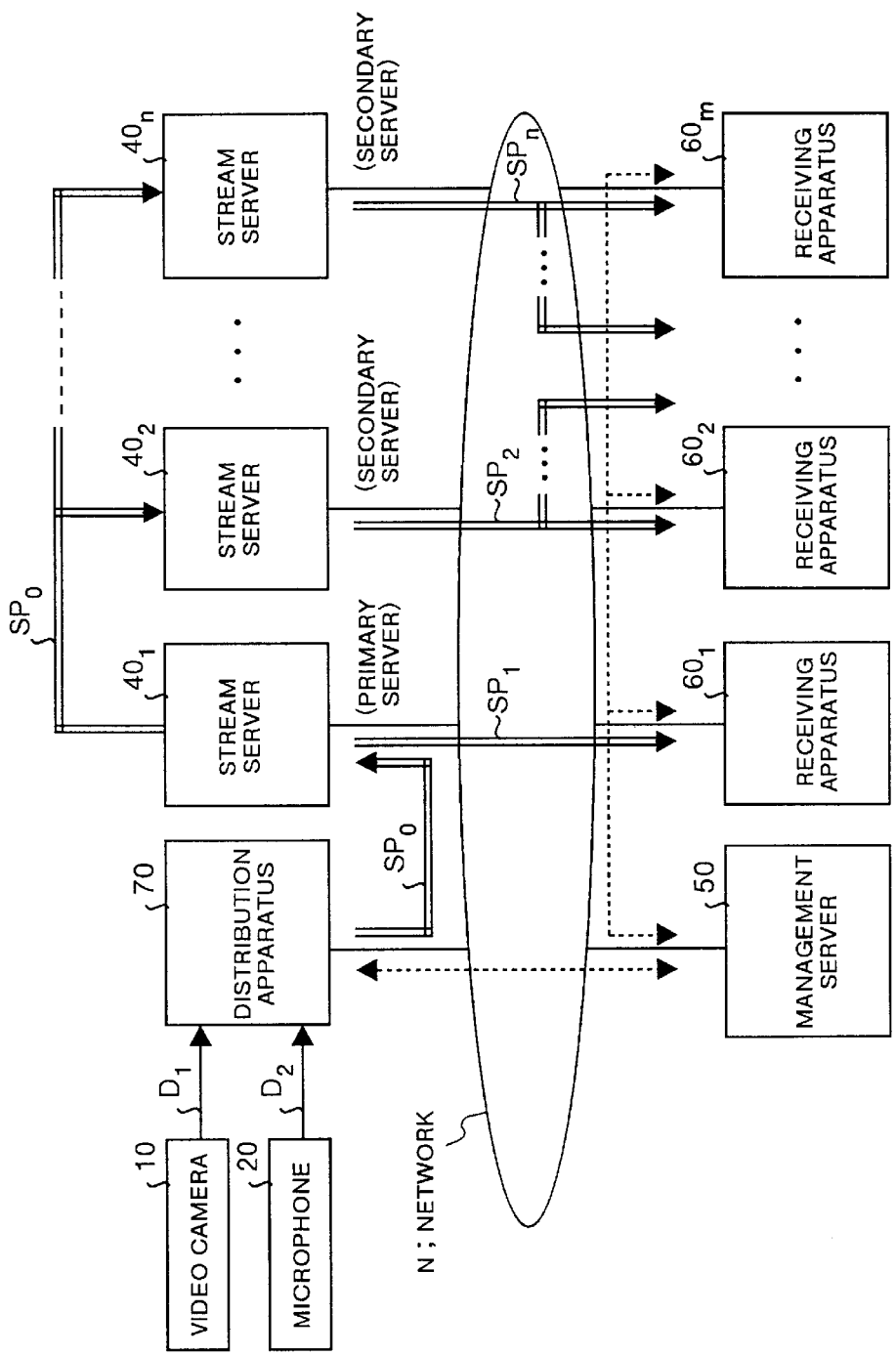

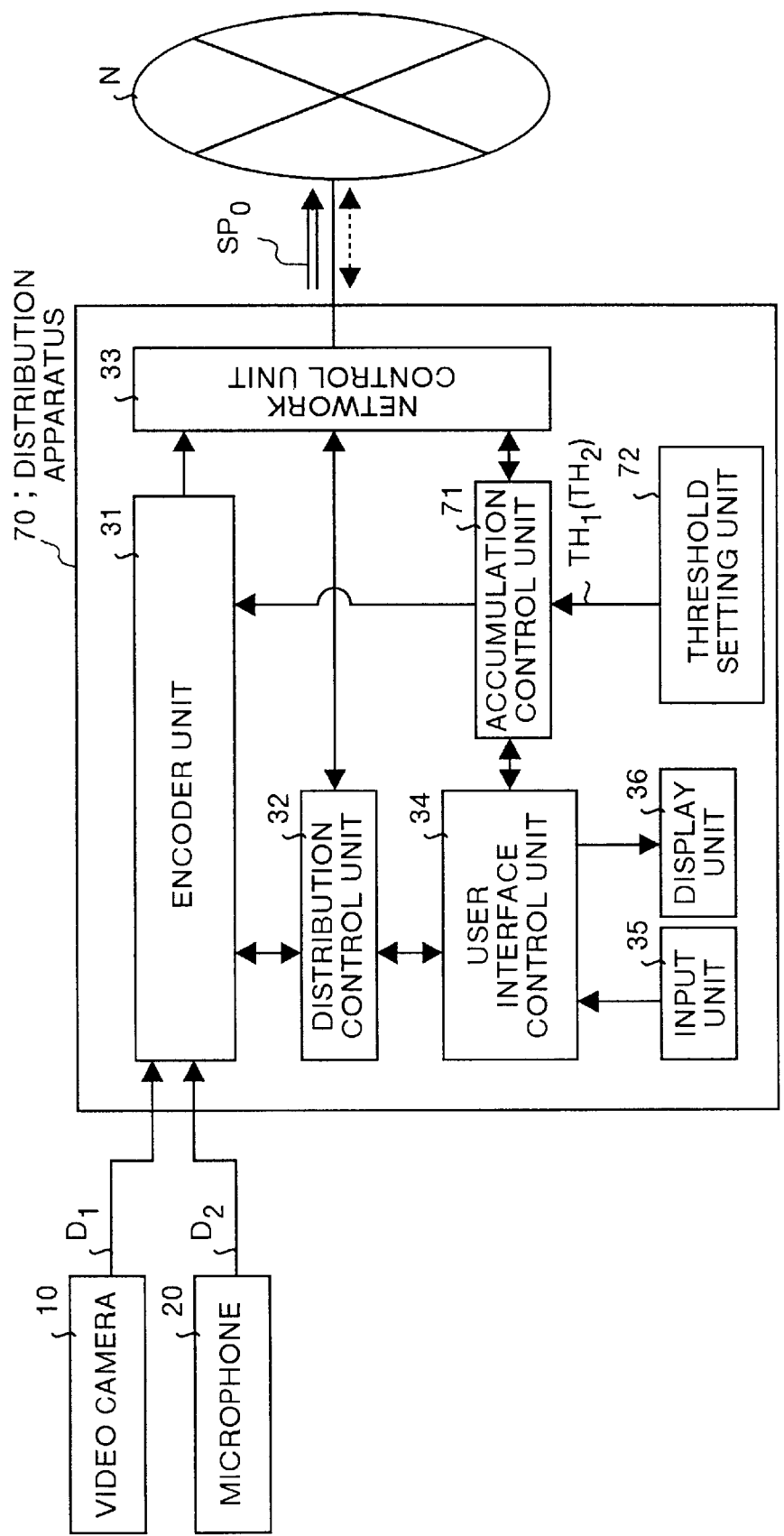

FIG.15
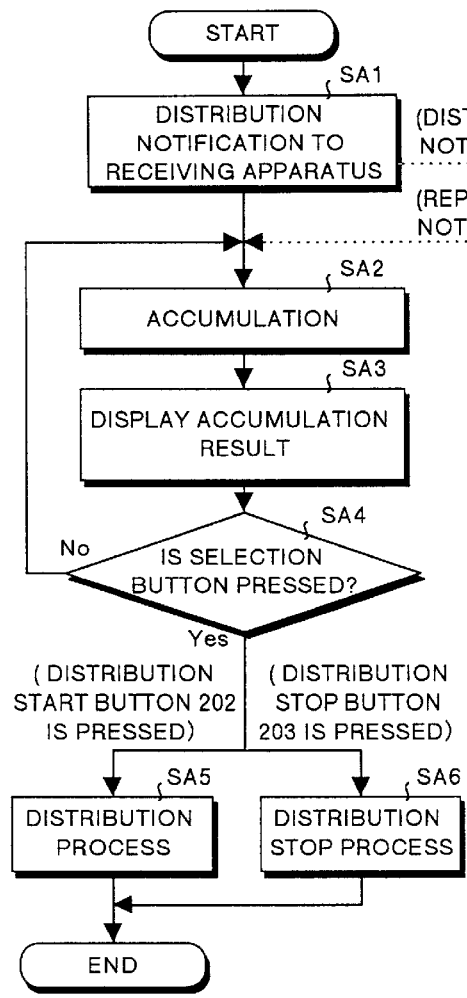
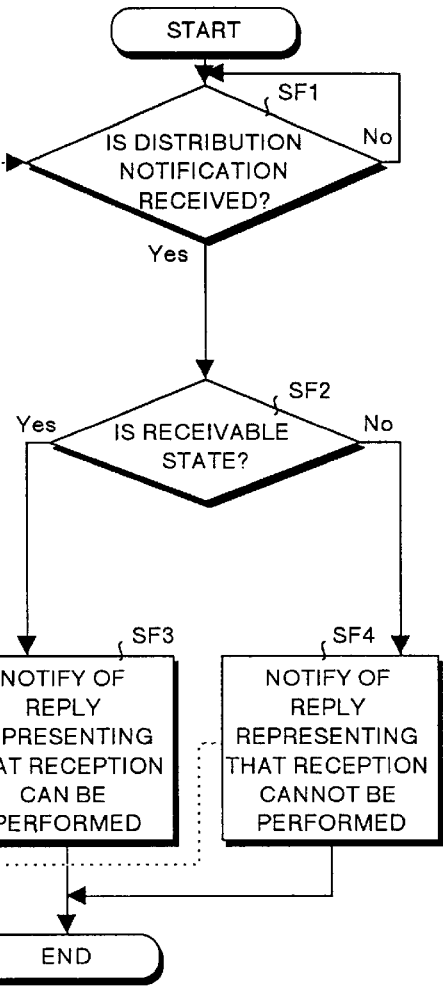

INFORMATION DISTRIBUTION APPARATUS, INFORMATION DISTRIBUTION METHOD, AND COMPUTER READABLE RECORDING MEDIUM ON WHICH INFORMATION DISTRIBUTION PROGRAM IS RECORDED

FIELD OF THE INVENTION

The present invention relates to an information distribution apparatus, an information distribution method, and a computer readable recording medium, on which an information distribution program is recorded, which distributes contents information (movie data and audio data) which can be reproduced in real time to a plurality of receiving apparatuses. More particularly, this invention relates to a technology of recognizing a number of recipients of the contents information on a distributor side.

BACKGROUND OF THE INVENTION

With popularization of the Internet and intranet, as in a conventional television broadcast, a system for lively broadcasting lectures and concerts has attracted attention. Contents information which can be reproduced in real time on a receiving apparatus is generated with a technology called the streaming technology, and the contents information is distributed uniformly to a plurality of receiving apparatuses through the Internet or the like. Under such a one-direction communication environment, information like whether the contents information is received or not cannot be obtained on the distribution side. Therefore, in order to effectively realize a live broadcast, means and method for recognizing of recipient side information are desired on the distribution side.

Under a conventional environment of the Internet or intranet, an information distribution system for distributing the circumstances of lectures or concerts as contents information (moving image or voice) to a recipient in real time has spread. This information distribution system comprises video cameras and microphones installed in a hall in which the lecture is given or a concert is preformed. A distribution apparatus generates a streaming packet (containing the contents information), utilizing the streaming technology, which can be reproduced in real time by using a from the image data obtained by the video camera and audio data obtained by the microphone. The distribution apparatus then distributes the streaming packet uniformly to a plurality of receiving apparatuses through the Internet or some other network.

The receiving apparatuses receive the streaming packet and reproduce the contents information (e.g. movie or the speech) in real time. Thus, in this information distribution system, if there is a receiving apparatus connected to the Internet or the like, then the contents distributed information can be received by the receiving apparatus in real time. Therefore, the information distribution system is attracting the attention in recent years.

When planing a live broadcast that uses such an information distribution system, a distributor (or a sponsor) generally advertises the date and time on which the live broadcast is started in advance. Such advertising is made by using electronic mails, homepage, leaflets or newspaper to attempt to increase the number of recipients of the live broadcast.

However, in a conventional technique, since the transmission is only one-directional, i.e. a transmission from the distribution apparatus to the receiving apparatus, a means for recognizing the number of recipients who actually watch the live broadcast on the distributor side does not exist. The live broadcast is started on the assumption that the number of recipients who are watching the live broadcast is enough so as to perform the live broadcast. Because the number of recipients cannot be accurately recognized, there may be a case such that the live broadcast is performed although there are very few or no watchers. Under this condition, a meaningless live broadcast is disadvantageously performed in vain.

SUMMARY OF THE INVENTION

It is an object of the present invention to provide an information distribution apparatus, an information distribution method, and a computer readable recording medium on which a program to execute the information distribution method on a computer is recorded, in which it is possible to recognize the number of recipients that receive the information on the distributor side, and also effectively distribute the information on the basis of thus recognized number of recipients.

In order to achieve the above object, the present invention according to one aspect provides an information distribution apparatus which comprises an inquiry unit for inquiring the plurality of receiving apparatuses to decide whether the receiving apparatuses accept the distribution of the information or not before the distribution of the information is started, an accumulation unit for accumulating the reply from the receiving apparatuses, and a distribution control unit for starting or stopping the distribution of the information on the basis of the result accumulated in the accumulation unit.

According to the above invention, before the distribution of the information is started, the inquiry unit inquires the receiving apparatuses to decide whether they accept the distribution. The receiving apparatuses output a reply representing whether they accept the distribution to the accumulation unit. The accumulation unit sequentially accumulates the reply obtained from the receiving apparatuses from which the number of receiving apparatuses that are ready to accept or that are not ready to accept the distribution can be determined. The distribution control unit starts or stops the distribution on the basis of the replies accumulated in the accumulation unit. For example, the distribution control unit starts the distribution when the number of receiving apparatuses ready to accept the distribution is above a threshold, on the other hand, stops the distribution if the number of receiving apparatuses which do not want to accept the distribution exceeds a threshold.

In this manner, an enquiry is made to the receiving apparatuses whether they accept the distribution, and the distribution is started or stopped on the basis of the accumulation result of the reply from the receiving apparatuses. Thus, the number of recipients (receiving apparatuses) that accept the distribution of the information can be accurately recognized on a distributor side, and the distribution of the information can be effectively performed on the basis of the recognition result.

Further, an informing unit for informing a distributor of the accumulation results, and a selection unit for selecting whether the distribution is started or stopped are provided. The distribution control unit starts or stops the distribution on the basis of the selection in the selection unit.

According to the above invention, the informing unit informs the accumulation results to the distributor. Thus, the distributor can decide whether the distribution is started or stopped. When the distributor selects the start or stop of the distribution using the selection unit, the distribution unit starts or stops the distribution.

In this manner, the number of recipients (receiving apparatuses) which accept the distribution can be recognized on the distributor side, and it is possible to decide whether the distribution is started or stopped.

Further, a comparison unit for comparing the number of receiving apparatuses which accept the distribution with a predetermined distribution start threshold is provided. The distribution control unit starts the distribution when the number of receiving apparatuses which accept the distribution exceeds the distribution start threshold.

According to the above invention, before the distribution of the information is started, the inquiry unit inquires the receiving apparatuses to decide whether they accept they distribution. The receiving apparatuses output a reply representing whether they accept the distribution to the accumulation unit. In this manner, the accumulation unit accumulates results sequentially replied from the receiving apparatuses to accumulate the number of receiving apparatuses accepting and not-accepting the distribution. The comparison unit compares the number of receiving apparatuses which accept the distribution with the distribution start threshold. The distribution control unit starts the distribution of the information when the number of receiving apparatuses which accept the distribution exceeds the distribution start threshold.

In this manner, the comparison unit compares the number of receiving apparatuses which accept the distribution with the distribution start threshold, and it is decided on the basis of the comparison result whether the distribution of the information can be started or not. Therefore, the distribution of the information can be automatically started without waiting for the decision of a distributor.

Further, a comparison unit for comparing the number of receiving apparatuses which do not accept the distribution with a predetermined distribution stop threshold is provided. The distribution control unit stops the distribution when the number of receiving apparatuses which do not accept the distribution exceeds the distribution stop threshold.

According to the above invention, before the distribution of the information is started, the inquiry unit inquires the receiving apparatuses to decide whether they accept the distribution. The receiving apparatuses output a reply representing whether they accept the distribution to the accumulation unit. The accumulation unit accumulates the reply sequentially obtained from the receiving apparatuses to accumulate the number of receiving apparatuses which accept and which do not accept the distribution. The comparison unit compares the number of receiving apparatuses which do not accept distribution with the distribution stop threshold. The distribution control unit stops the distribution of the information when the number of receiving apparatuses which do not accept distribution exceeds the distribution stop threshold.

In this manner, the comparison unit compares the number of receiving apparatuses which do not accept the distribution with the distribution stop threshold, and it is decided on the basis of the comparison result whether the distribution of the information can be stopped or not. Therefore, the distribution of the information can be automatically stopped without waiting for the decision of a distributor.

Further, a timer unit for counting a waiting time from when the inquiry is made for the plurality of receiving apparatuses, a first comparison unit for comparing the waiting time and a predetermined waiting time set value, and a second comparison unit for comparing the number of receiving apparatuses which accept the distribution with a predetermined distribution start threshold are provided. The distribution control unit stops the distribution on the basis of the comparison results of the first comparison unit and the second comparison unit when the waiting time is greater than the pre-set waiting time and when the number of receiving apparatuses which accept the distribution is less than the distribution start threshold.

According to the above invention, before the distribution of the information is started, the inquiry unit inquires the receiving apparatuses to decide whether they accept the distribution or not. The receiving apparatuses output a rely representing whether they accept the distribution to the accumulation unit. The accumulation unit accumulates the reply sequentially obtained from the receiving apparatuses to obtain the number of receiving apparatuses which accept or which do not accept the distribution. The first comparison unit compares the waiting time with the waiting time set value and the second comparison unit compares the number of receiving apparatuses which accept the distribution with the distribution start threshold. The distribution control unit stops the distribution when the waiting time greater than the pre-set waiting time and when the number of receiving apparatuses which accept the distribution is less than the distribution start threshold.

In this manner, the first comparison unit compares the waiting time with the pre-set waiting time, the second comparison unit is arranged to compare the number of receiving apparatuses which accept distribution with the distribution start threshold, and it is decided on the basis of the two comparison results whether the distribution of the information can be stopped or not. For this reason, distribution of the information can be automatically stopped without the decision of the distributor when the number of receiving apparatuses which accepts distribution does not reach the distribution start threshold even after the predetermined waiting time has elapsed.

The present invention according to another aspect provides an information distribution apparatus which comprises an inquiry unit for inquiring the plurality of receiving apparatuses to decide whether they are in a position to accept the distribution of the information before the distribution of the information is started, an accumulation unit for accumulating the reply obtained from the receiving apparatuses, and a distribution control unit for starting or stopping the distribution of the information on the basis of the number of replies accumulated in the accumulation unit.

According to the above invention, before the distribution of the information is started, the inquiry unit inquires the plurality of receiving apparatuses to decide whether they are in a position to accept the distribution. The receiving apparatuses check their own status and output a reply representing whether they can accept the distribution to the accumulation unit. The accumulation unit sequentially accumulates the reply obtained from the receiving apparatuses from which the number of receiving apparatuses that can accept or that can not accept the distribution can be determined. The distribution control unit starts or stops the distribution on the basis of the replies accumulated in the accumulation unit.

In this manner, the plurality of receiving apparatuses are inquired to decide whether they can accept the distribution, and the distribution is started or stopped on the basis of the number of replies accumulated. Thus, information regarding emergency can be effectively distributed to the receiving apparatuses regardless of whether the receiving apparatuses want to receive it or not.

The present invention according to still another aspect provides an information distribution method which comprises an is inquiry step of inquiring the plurality of receiving apparatuses to decide whether the plurality of receiving apparatuses accept distribution of the information or not before the distribution of the information is started, an accumulation step of accumulating replies from the plurality of receiving apparatuses corresponding to the inquiry, and a distribution control step of starting or stopping the distribution of the information on the basis of the accumulation result of the accumulation step.

According to the above invention, before the distribution of the information is started, in the inquiry step, the receiving apparatuses are inquired to decide whether they accept the distribution or not. The receiving apparatuses output a reply representing whether they accept the distribution. In the accumulation step, replies sequentially obtained from the receiving apparatuses are accumulated to obtain the number of receiving apparatuses which accept and which do not accept the distribution. In the distribution control step, distribution of information is started or stopped on the basis of the accumulation result in the accumulation step. For example, in the distribution control step, the distribution of the information is started when the number of receiving apparatuses which accept the distribution exceed a threshold, and the distribution of the information is stopped when the number of receiving apparatuses which do not accept the distribution exceed the threshold.

In this manner, the receiving apparatuses are inquired to decide whether the receiving apparatuses accept distribution, and the distribution of the information is started or stopped on the basis of the accumulation result of replies corresponding to the inquiry. For this reason, the number of recipients (receiving apparatuses) which accept the distribution of the information can be accurately recognized on a distributor side, and the distribution of the information can be effectively performed on the basis of the recognition result.

The present invention according to still another aspect provides a computer readable recording medium on which an information distribution program applied to an information distribution apparatus for distributing information which can be reproduced in real time to a plurality of receiving apparatuses is recorded. The information distribution program causes a computer to execute the steps of inquiring the receiving apparatuses to decide whether they accept the distribution of the information or not before the distribution of the information is started, accumulating the reply from the receiving apparatuses, and starting or stopping the distribution of the information on the basis of the accumulation result at the accumulation step.

Further, the information distribution program causes a computer to execute the steps of informing a distributor of the accumulation result, and selecting whether the distribution is started or stopped on the basis of an informing result in the informing step. The distribution is started or stopped on the basis of a selection result in the selection step.

According to the above invention, the program can be executed on a computer and the information distribution method according to the present invention can be realized on the computer.

Other objects and features of this invention will become apparent from the following description with reference to the accompanying drawings.

BRIEF DESCRIPTION OF THE DRAWINGS

FIG. 5A and FIG. 5B are diagrams showing a receiving-apparatus-side selection screen 100 and a distribution-apparatus-side selection screen 200 according to the first to fourth embodiments.

FIG. 6 is a block diagram showing the configuration of a second embodiment according to the present invention.

FIG. 7 is a block diagram showing the configuration of a distribution apparatus 70 shown in FIG. 6.

FIG. 15 is a flow chart for explaining the operation of the fourth embodiment.

DESCRIPTION OF THE PREFERRED EMBODIMENTS

First to fourth embodiments of an information distribution apparatus, an information distribution method, and a computer readable recording medium on which an information distribution program is recorded according to the present invention will be described below with reference to the accompanying drawings.

Figure 1:
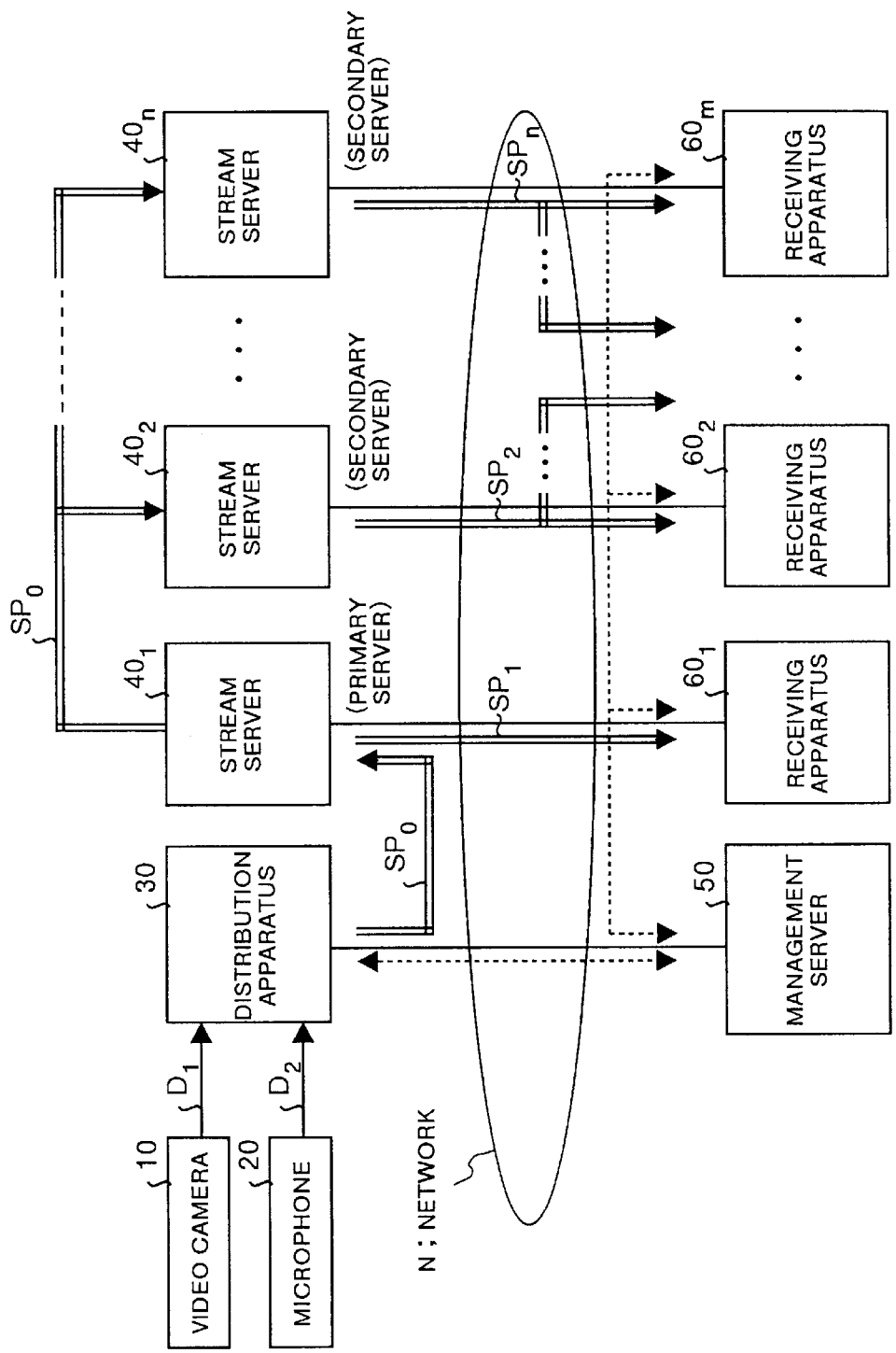
FIG. 1 is a block diagram showing the configuration of a first embodiment according to the present invention.

FIG. 1 is a block diagram showing the configuration of a first embodiment according to the present invention. An information distribution system shown in FIG. 1 is a system in which contents information (moving image data and image data) are distributed to a plurality of receiving apparatuses in real time by using a streaming technique, and the distributed contents information is reproduced in real time. Since this information distribution system can perform real-time reproduction, it can be used for a live broadcast of lectures, concerts, and the like. As a distribution protocol in the information distribution system, for example, the UDP (User Datagram Protocol) is used. However, any types of distribution protocols may be used. In addition, in the information distribution system, the contents information may be distributed by using an MBone (virtual Multicast Backbone On the interNEt) technique.

The network N shown in FIG. 1 is an intranet, the Internet, or the like, and can transmit the streaming packets $SP_o$ to $SP_n$ and the like. A distribution apparatus 30 installed on a distributor side, stream servers $40_1$ to $40_n$, a management server 50, and receiving apparatuses $60_1$ to $60_m$ (m≧n) respectively arranged on a user side (recipient side) are connected to the network N.

The distribution apparatus 30 generates the streaming packet $SP_o$ (contents information) to be distributed to the receiving apparatuses $60_1$ to $60_m$. The streaming packet $SP_o$ is a packet obtained such that contents information consisting of movie data and audio data are compressed by using a stream band, a frame rate, a screen size, and the like as parameters. Here, the stream band is an occupancy transmission band when the streaming packet $sp_o$ is transmitted to the network N. The frame rate is the number of screens per second of the contents information reproduced in real time on the user side. A movie can be reproduced smoothly when the frame rate is high. A wide stream band is necessary for the frame rate. The screen size is the number of pixels (the number of vertical pixels x the number of lateral pixels) constituting the display screen of the contents information reproduced in real time on the user side.

A video camera 10 is installed in a lecture hall or a concert hall to perform image pickup for the circumstances of a lecture or a concert and to output the image-pickup result to the distribution apparatus 30 as movie data $D_1$. Similarly, a microphone 20 is installed in the lecture hall or the concert hall. The microphone 20 converts the voice of a lecturer or the voice in the concert hall into audio data $D_2$ to output the audio data $D_2$ to the distribution apparatus 30 in real time.

The configuration of the distribution apparatus 30 described above will be described below with reference to FIG. 2. The same reference numerals as in FIG. 1 denote the same parts in FIG. 2. In the distribution apparatus 30 shown in FIG. 2, an encoder unit 31 encodes the movie data $D_1$ and the audio data $D_2$ captured in the video camera 10 and the microphone 20 respectively on the basis of the parameters such as the stream band, the frame rate, and the screen size to generated streaming packet $SP_o$.

More specifically, the encoder unit 31 converts the movie data $D_1$ and the audio data $D_2$ into digital data, and reduces the amounts of information of the digital data in consideration of the screen size, the frame rate, and the like. In addition, the encoder unit 31 compresses the digital data in real time by using a codec technique to generate the streaming packet SP, synchronized with the movie data $D_1$ and the audio data $D_2$.

The distribution control unit 32 performs distribution control of the streaming packet $SP_o$, a distribution notification or the like for notifying the receiving apparatuses $60_1$ to $60_m$ that the contents information is distributed to the receiving apparatuses $60_1$ to $60_m$. The operation of the distribution control unit 32 will be described later. A network control unit 33 has a function of transmitting the streaming packet SP, to the network N at a transfer rate depending on the transmission band of the network N by using a distribution protocol. The network control unit 33 also has a buffering function for buffering the streaming packet $SP_o$, when packet loss occurs during transmission of the streaming packets $SP_o$, because of congestion of the network N.

In addition, the network control unit 33 exchanges distribution control information with a management server 50 (see FIG. 1) by using not only the distribution protocol but also the TCP/IP (Transmission Control Protocol/Internet Protocol). As this distribution control information, pieces of information represented by the following items (1) and (2):

(1) A distribution notification for instructing the management server 50 to notify the receiving apparatuses $60_1$ to $60_m$ (see FIG. 1) that the contents information is distributed to the receiving apparatuses $60_1$ to $60_m$; and (2) A reply notification information related to a reply notification for the distribution notification from the receiving apparatuses $60_1$ to $60_m$.

As the reply notification of the item (2), two types of reply notifications, i.e., a notification representing that a user accepts to receive the contents information and a notification representing that the user rejects the reception are available. In this manner, transmission/reception of information is performed between the distribution apparatus 30 and the receiving apparatuses $60_1$ to $60_m$ through the management server 50.

A user interface control unit 34 makes interfaces among a distribution control unit 32, an input unit 35, a display unit 36, and an accumulation control unit 37. The input unit 35 is an input device such as a mouse or a keyboard. The display unit 36 is an LCD (Liquid Crystal Display), a CRT (Cathode-Ray Tube), or the like to display various pieces of information required for a distribution operation. As the various pieces of information, the address information of distribution destinations and a distribution-apparatus-side selection screen 200 shown in FIG. 5B are used. The distribution-apparatus-side selection screen 200 is a screen for causing a distributor to select whether distribution is to be started or stopped. The details of the distribution-apparatus-side selection screen 200 will be described later.

Returning to FIG. 2, the accumulation control unit 37 accumulates the information of the item (2), i.e., a plurality of reply notifications from the receiving apparatuses $60_1$ to $60_m$, and gives the accumulation result to the distribution control unit 32 through the user interface control unit 34. More specifically, the accumulation control unit 37 accumulates the number of users which accept distribution of the contents information and the number of users which do not accept the distribution.

Returning to FIG. 1, the stream servers $40_1$ to $40_n$ are servers n in number which are dispersedly arranged, and distribute the streaming packets $SP_1$ to $SP_n$ to the receiving apparatuses $60_1$ to $60_m$, respectively. Out of the stream servers $40_1$ to $40_n$, the stream server $40_1$ functions as a primary server, and the stream servers $40_2$ to $40_n$ function as secondary servers.

The destinations for distribution of the stream servers $40_1$ to $40_n$ are grouped in order to disperse the work load. More specifically, the distribution destinations of the stream server $40_1$ is the receiving apparatus $60_1$. The distribution destinations of the stream server $40_2$ are the receiving apparatus $60_2$ and a not shown receiving apparatus $60_3$. Similarly, the distribution destinations of the stream servers $40_n$ is the receiving apparatus $60_m$ and a not shown receiving apparatus $60_{m-1}$. The management server 50 designates the stream server(s) to be connected to the receiving apparatuses $60_1$ to $60_m$ and thus realizes this load dispersion.

The stream server $40_1$ (primary server) receives the streaming packet $SP_o$ from the distribution apparatus 30 through the network N to distribute the streaming packet $SP_o$ to the stream servers $40_2$ to $40_n$ (secondary servers). The stream servers $40_1$ to $40_n$ distribute the streaming packet $SP_o$ to the respective distribution destinations as the streaming packets $SP_1$ to $SP_n$, respectively. In this manner, the streaming packets $SP_1$ to $SP_n$ which contains the same information are distributed at once from the stream servers $40_1$ to $40_n$ to the receiving apparatuses $60_1$ to $60_m$ which accept the reception.

The management server 50 transmits distribution notifications to the receiving apparatuses $60_1$ to $60_m$ at once before the contents information is distributed according to the distribution notification instruction information from the distribution apparatus 30 as described above. The management server 50 receives reply notifications for the distribution notifications from the receiving apparatuses $60_1$ to $60_m$ and gives the reply notifications to the distribution apparatus 30 as reply notification information through the network N.

The receiving apparatuses $60_1$ to $60_m$ are devices which receive the streaming packets $SP_1$ to $SP_n$ distributed from the stream servers $40_1$ to $40_n$ through the network N and which reproduce the contents information (movie data and audio data) from the streaming packets $SP_1$ to $SP_n$. The receiving apparatuses $60_1$ to $60_m$ receive a distribution notification from the management server 50 before the contents information is distributed and return a reply notification corresponding to the distribution notification to the management server 50. The reply notification is the information representing whether the streaming packets $SP_1$ to $SP_n$ are to be received or not, in other words, whether the contents information is to be accepted or not.

Figure 3:
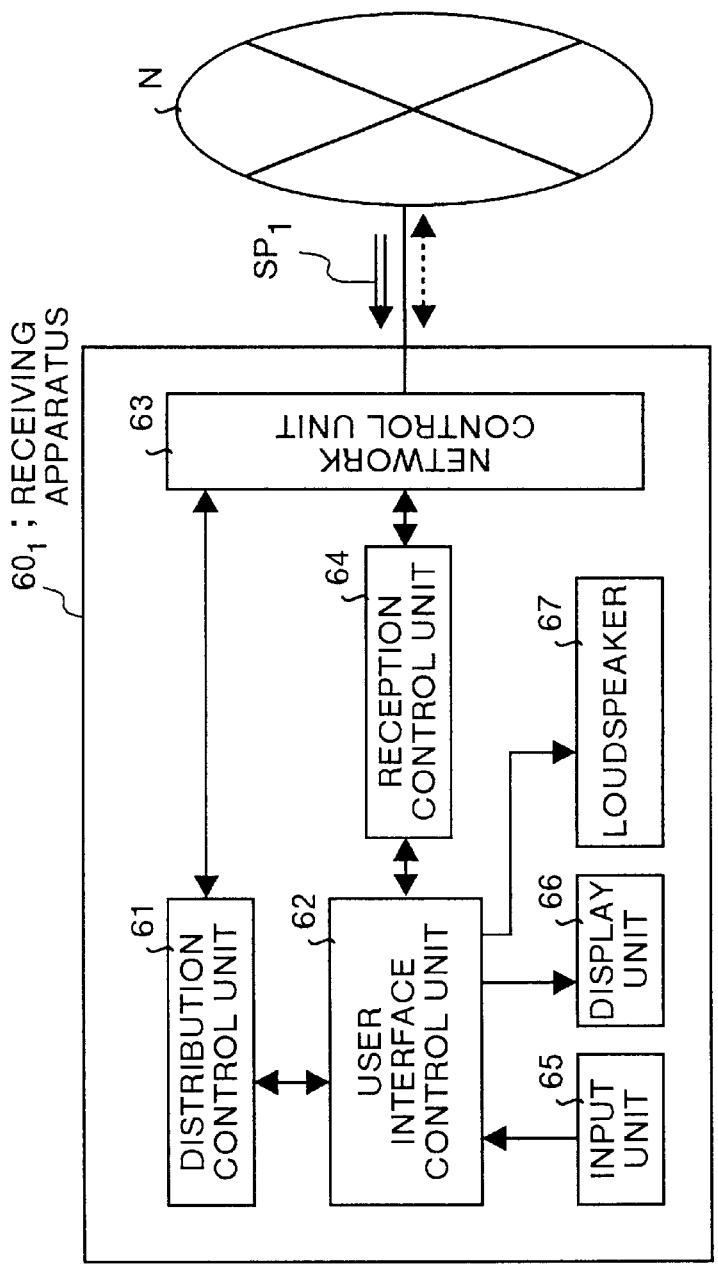
FIG. 3 is a block diagram showing the configuration of a receiving apparatus 60, shown in FIG. 1.

The configuration of the receiving apparatus $60_1$ described above will be described below with reference to FIG. 3. The same reference numerals as in FIG. 1 denote the same parts in FIG. 3. A distribution control unit 61 shown in FIG. 3 performs reproduction control of the distributed streaming packet $SP_1$ (contents information), a reply notification related to information representing that the streaming packet $SP_1$ is received to the distribution apparatus 30 (management server 50), and the like. The details of the operation of the distribution control unit 61 will be described later.

The user interface control unit 62 makes interfaces among the distribution control unit 61, a reception control unit 64, an input unit 65, a display unit 66, and a loudspeaker 67. The network control unit 63 has a function of receiving the streaming packet $SP_1$ from the stream server $40_1$ (see FIG. 1) by using the distribution protocol. In addition, the network control unit 63 exchanges the distribution control information described above with the management server 50 (see FIG. 1) by using not only the distribution protocol but also the TCP/IP.

The reception control unit 64 controls reception of the streaming packet $SP_1$ in the network control unit 63 according to an instruction from the distribution control unit 61. More specifically, when reception is instructed by the distribution control unit 61, the reception control unit 64 controls the network control unit 63 to receive the streaming packet $SP_1$.

The input unit 65 is an input device such as a mouse or a keyboard. The display unit 66 is an LCD, a CRT, or the like, and reproduces a movie of the contents information. The display unit 66 receives a distribution notification from the management server 50 (distribution apparatus 30) before distribution to display a receiving-apparatus-side selection screen 100 shown in FIG. 5A. The receiving-apparatus-side selection screen 100 is a screen for causing a user to select whether a live broadcast is received or not, i.e., whether distribution of the contents information is accepted or not. The details of the receiving-apparatus-side selection screen 100 will be described later. The loudspeaker 67 reproduces the voice from the contents information.

The operation of the first embodiment will be described below with reference to the flow chart shown in FIG. 4. In the following description, a case in which a distributor (Yuji Matsuzaki) shown in FIG. 5A gives a lecturer "About streaming system", and the lecture is lively broadcast will be explained. More specifically, in the following description, a case in which a movie and voice related to the lecture are distributed to the receiving apparatuses $60_1$ to $60_m$ as contents information (streaming packets $SP_1$ to $SP_n$) will be explained.

Figure 4:
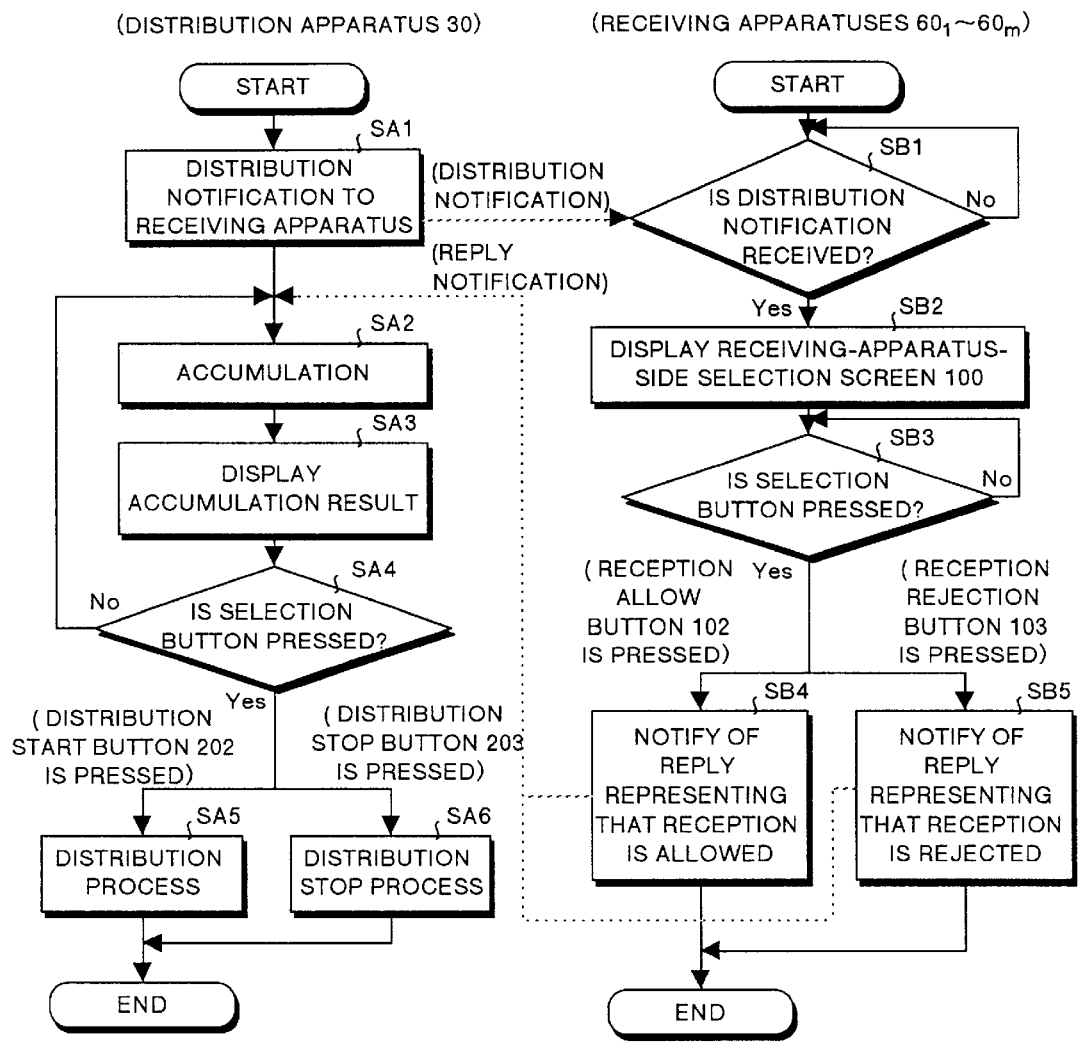
FIG. 4 is a flow chart for explaining the operation of the first embodiment.

In FIG. 1, when the receiving apparatuses $60_1$ to $60_m$ are started, the receiving apparatuses $60_1$ to $60_m$ perform the processing at step SB1 shown in FIG. 4 and decide whether they have respectively received the distribution notifications from the management server 50 (distribution apparatus 30). The decision result here is "No", and therefore the same decision is repeated. In the following description, since each of the operations of the receiving apparatuses $60_2$ to $60_m$ is the same as the operation of the receiving apparatus $60_1$, the operation of the receiving apparatus $60_1$ shown in FIG. 3 will be explained.

Before a live broadcast is started, when information for performing an instruction to transmit a distribution notification is input by a distributor (or another operator) by means of the input unit 35 (see FIG. 2), the distribution control unit 32 performs the processing at step SA1 shown in FIG. 4 and transmits the distribution notification to the receiving apparatuses $60_1$ to $60_m$ to the management server 50 through the network N.

The distribution control unit 32 causes the display unit 36 to display the distribution-apparatus-side selection screen 200 shown in FIG. 5B. On the distribution-apparatus-side selection screen 200, the title ("About streaming system") of a live broadcast and an authentication text ("At present . . . persons are ready for reception. Waiting for your response.") of the number of recipients which receive the live broadcast are displayed. In a recipient count display region 201, a reception allowed person count x is displayed. This reception allowed person count x is the number of users (recipients) which receive the live broadcast. Therefore, the distributor can recognize the number of users (recipients) which receive the live broadcast by checking visually the reception allowed person count x. However, in an initial state, the reception allowed person count x is 0. On the distribution-apparatus-side selection screen 200, a query text ("Would you like to accept the distribution?") related to the start of distribution is displayed.

In addition, on the distribution-apparatus-side selection screen 200, a distribution start button 202 and a distribution stop button 203 serving as software buttons are displayed. The distribution start button 202 and the distribution stop button 203 are selection buttons for selecting the start or stop of distribution. More specifically, the distribution start button 202 is pressed when distribution is to be started, and the distribution stop button 203 is pressed when the distribution is to be stopped. The distribution start button 202 and the distribution stop button 203 can be pressed by the use of the mouse serving as the input unit 35 (see FIG. 2).

In FIG. 1, when the distribution notification instruction information is received, the management server 50 transmits distribution notifications to the receiving apparatuses $60_1$ to $60_m$ at once. When the receiving apparatus $60_1$ receives the distribution notification, the distribution control unit 61 decides the result in step SB1 as "Yes" and performs the processing at step SB2. In step SB2, the distribution control unit 61 controls the user interface control unit 62 to cause the display unit 66 to display the receiving-apparatus-side selection screen 100 shown in FIG. 5A, and then shifts to the processing in step SB3.

On the receiving-apparatus-side selection screen 100, information 101 related to live broadcast contents consisting of a notification text ("Following live broadcast will be performed.") representing that a live broadcast is performed, a distributor ("Yuji Matsuzaki"), and a title ("About streaming system") is displayed. A user can visually check the notification text and the information 101 to recognize that a live broadcast is about to be performed and also know the contents of the live broadcast.

On the receiving-apparatus-side selection screen 100, a query text ("Is this live broadcast to be received?") representing whether a live broadcast is received or not. Therefore, the user visually checks the query text to decide whether the live broadcast is received or not. In addition, on the receiving-apparatus-side selection screen 100, a reception allow button 102 and a reception rejection button 103 which are software buttons.

The reception allow button 102 and the reception rejection button 103 are selection buttons for selecting whether reception is performed or not. More specifically, the reception allow button 102 is pressed as software when reception is to be allowed, and the reception rejection button 103 is pressed as software when the reception is rejected. The reception allow button 102 and the reception rejection button 103 are pressed by drag and drop operations performed by the mouse serving as the input unit 65 (see FIG. 3).

In step SB3, the distribution control unit 61 of the receiving apparatus $60_1$ (see FIG. 3) decides whether the selection button (reception allow button 102 or reception rejection button 103) is pressed by a user. If it is determined that the selection button is not pressed, the decision result will be "No", and therefore the same decision is repeated.

A user visually checks the receiving-apparatus-side selection screen 100 shown in FIG. 5A and presses the reception allow button 102 by using the input unit 65 to make an expression of intention that a live broadcast is to be received. In this manner, since the reception allow button 102 is pressed, the decision result in step SB3 will be "Yes" and the processing at step SB4 will be performed. In step SB4, the distribution control unit 61 of the receiving apparatus $60_1$ transmits a reply notification representing that reception is allowed to the management server 50 (distribution apparatus 30) to end the series of processes.

On the other hand, when the live broadcast is not to be received, the user presses the reception rejection button 103 by using the input unit 65. In this manner, since the reception rejection button 103 is pressed, the decision result in step SB3 will be "Yes" and the processing in step SB5 will be performed. In step SB5, the distribution control unit 61 of the receiving apparatus $60_1$ transmits a reply notification representing that reception is rejected to the management server 50 (distribution apparatus 30) to end the series of processes. Like the receiving apparatus $60_1$, the receiving apparatuses $60_2$ to $60_m$ also sequentially transmit reply notifications each representing that reception is allowed or that reception is rejected to the management server 50 (distribution apparatus 30), and then end the series of processes.

When the management server 50 sequentially receives reply notifications from the receiving apparatuses $60_1$ to $60_m$, the management server 50 gives the reply notifications to the distribution apparatus 30 as reply notification information through the network N in the order of reception. In this manner, in step SA2, the accumulation control unit 37 shown in FIG. 2 accumulates the reply notifications. More specifically, each time the accumulation control unit 37 receives one reply notification representing that reception is allowed, the accumulation control unit 37 increments the reception allowed person count x (see FIG. 5B) by one. Similarly, each time the accumulation control unit 37 receives one reply notification representing that reception is rejected, the accumulation control unit 37 increments a reception rejecting person count y by one to accumulate replay notifications. The accumulation control unit 37 gives an accumulation result (reception allowed person count x and reception rejecting person count y) to the distribution control unit 32 through the user interface control unit 34.

In this manner, in step SA3, the distribution control unit 32 displays a present reception allowed person count x of the accumulation result (reception allowed person count x and reception rejecting person count y) in the recipient count display region 201 shown in FIG. 5B. In step SA4, the distribution control unit 32 decides whether the selection button (distribution start button 202 or distribution stop button 203) is pressed by a user. If the selection button is not pressed, the decision result will be "No". Therefore, accumulation of reply notifications and an accumulation result (reception allowed person count x) are displayed every time a reply notification is received in step SA2 and step SA3 until the decision result in step SA4 is "Yes".

A distributor visually checks the reception allowed person count x displayed in the recipient count display region 201 of the distribution-apparatus-side selection screen 200 shown in FIG. 5B, and decides whether the reception allowed person count x reaches the prescribed number of persons. If the reception allowed person count x does not reach the predicted number of persons, a distributor is in a waiting state without any operation. During the waiting state, the reception allowed person count x shown in FIG. 5A is incremented each time a reply notification that reception is allowed is received.

When the reception allowed person count x reaches the prescribed number of persons, a distributor presses the distribution start button 202 by using the input unit 35 to start the live broadcast of the lecture. In this manner, since the distribution start button 202 is pressed, the distribution control unit 32 determines the decision result in step SA4 as "Yes" and shift to the processing in step SA5. In step SA5, the distribution control unit 32 controls the respective parts of the apparatus to perform a distribution process.

Figure 2:
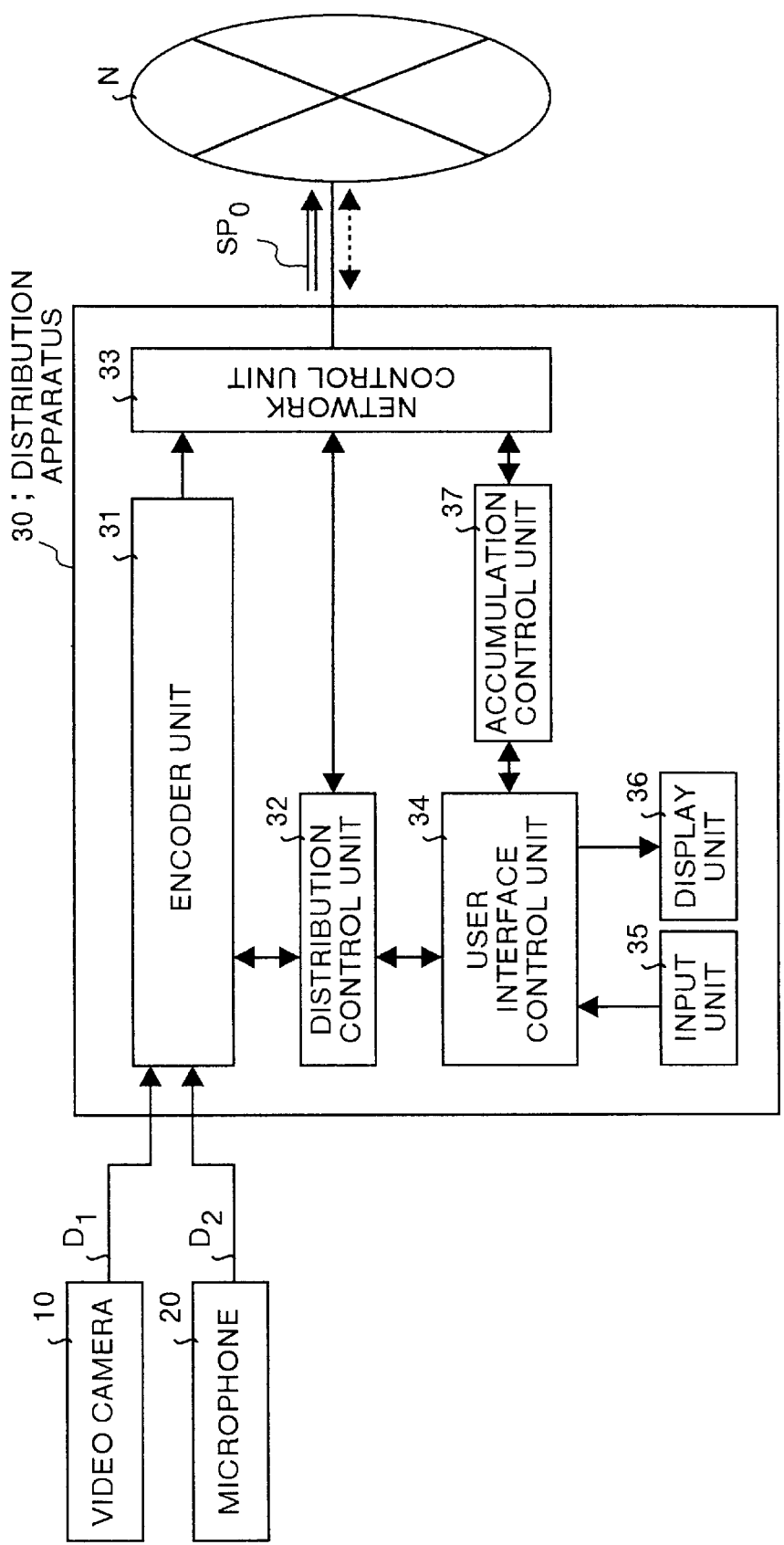
FIG. 2 is a block diagram showing the configuration of a distribution apparatus 30 shown in FIG. 1.

In this distribution process, movie data $D_1$ and audio data $D_2$ related to a lecture are output from the video camera 10 and the microphone 20 shown in FIG. 2. When the movie data $D_1$ and the audio data $D_2$ are captured by the encoder unit 31, the encoder unit 31 encodes and compresses the movie data $D_1$ and the audio data $D_2$ on the basis of parameters such as a stream band to generate the streaming packet $SP_o$.

The streaming packet $SP_o$ is distributed to the stream servers $40_1$ to $40_n$ shown in FIG. 1 through the network control unit 33 and the network N. The stream servers $40_1$ to $40_n$ distribute the streaming packet $SP_o$ as the streaming packets $SP_1$ to $SP_n$ to the receiving apparatuses $60_1$ to $60_m$, respectively.

No streaming packet is distributed to a receiving apparatus which transmits a reply notification representing that reception is to be rejected. Therefore, in the receiving apparatus which transmits the reply notification representing that reception is rejected, contents information is not reproduced.

On the other hand, of the receiving apparatuses $60_1$ to $60_m$, a receiving apparatus which transits a reply notification representing that reception is allowed, receives a streaming packet under the control of the reception control unit (FIG. 3: see the reception control unit 64), and then reproduce the contents information. For example, in the receiving apparatus $60_1$ shown in FIG. 3, when the streaming packet $SP_1$ is received by the network control unit 63, the streaming packet $SP_1$ is given to the distribution control unit 61.

In this manner, the distribution control unit 61 restores the streaming packet $SP_1$ to generate movie data and audio data. The distribution control unit 61 supplies the movie data and the audio data which are synchronized with each other to the display unit 66 and the loudspeaker 67 through the user interface control unit 62. For this reason, the a movie representing the circumstances of the lecture is reproduced in real time in the display unit 66, and the voice of the lecturer is reproduced in real time in synchronism with the movie in the loudspeaker 67.

On the other hand, when the reception allowed person count x does not reach the prescribed number of persons when a waiting time starting after a distribution notification is transmitted is longer than a predetermined period of time, a distributor presses the distribution stop button 203 by using the input unit 35 and stops the live broadcast to the lecture. In this manner, since the distribution stop button 203 is pressed, the distribution control unit 32 determines the decision result in step SA4 as "Yes", and performs the processing in step SA6. In step SA6, the distribution control unit 32 controls the parts of the apparatus to perform a distribution stop process. In this distribution stop process, the distribution control unit 32 notifies the receiving apparatuses $60_1$ to $60_m$ that the live broadcast (lecture) is stopped through the management server 50.

As described above, according to the first embodiment, distribution notifications each of which inquires whether distribution is accepted or not are transmitted to the plurality of receiving apparatuses $60_1$ to $60_m$, and the distribution of the contents information is started or stopped on the basis of an accumulation result of reply notifications corresponding to the distribution notifications. For this reason, the number of recipients which accept the distribution of the contents information is accurately recognized on the distributor side, and the contents information can be effectively distributed on the basis of the recognition result.

According to the first embodiment, since an accumulation result (reception allowed person count x) of the accumulation control unit 37 is displayed on the display unit 36, the number of recipients which accept distribution can be accurately recognized on the distribution side, and it can be decided on the basis of the recognition result whether the distribution is started or stopped.

A case is explained above in which a distributor decides whether distribution is started or stopped by checking the reception allowed person count x (see FIG. 5B). However, the above decision may be performed on the basis of a predetermined threshold. This case will be described as a second embodiment.

FIG. 6 is a block diagram showing the configuration of the second embodiment according to the present invention. The same reference numerals as in FIG. 1 denote the same parts in FIG. 6, and a description thereof will be omitted. In FIG. 6, a distribution apparatus 70 is provided in place of the distribution apparatus 30 shown in FIG. 1. The basic function of the distribution apparatus 70 is the same as that of the distribution apparatus 30. However, the distribution apparatus 70 is different from the distribution apparatus 30 in that it is decided by using the threshold whether the distribution is started or stopped.

The configuration of the distribution apparatus 70 will be described below with reference to FIG. 7. The same reference numerals as in FIG. 2 denote the same parts in FIG. 7, and a description thereof will be omitted. In FIG. 7, an accumulation control unit 71 is newly provided in place of the accumulation control unit 37 shown in FIG. 2, and a threshold setting unit 72 is newly arranged.

The accumulation control unit 71 shown in FIG. 7 accumulates a plurality of reply notifications from receiving apparatuses $60_1$ to $60_m$ (see FIG. 6) in the same manner as that of the accumulation control unit 37, and gives an accumulation result (reception allowed person count x and reception rejecting person count y) to a distribution control unit 32 through a user interface control unit 34.

As Operation Example 1, the accumulation control unit 71 compares the reception allowed person count x with a distribution start threshold $TH_1$ which is preset by the threshold setting unit 72, and automatically executes a distribution process regardless of the decision of a distributor when the reception allowed person count x is equal to or larger than the distribution start threshold $TH_1$. Further, as Operation Example 2, the accumulation control unit 71 compares the reception rejecting person count y with a distribution stop threshold $TH_2$ which is preset by the threshold setting unit 72, and automatically executes the distribution stop process regardless of the decision of the distributor when the reception rejecting person count y is equal to or larger than the distribution stop threshold $TH_2$. The threshold setting unit 72 sets the distribution start threshold $TH_1$ or the distribution stop threshold $TH_2$ into the accumulation control unit 71.

Figure 8:
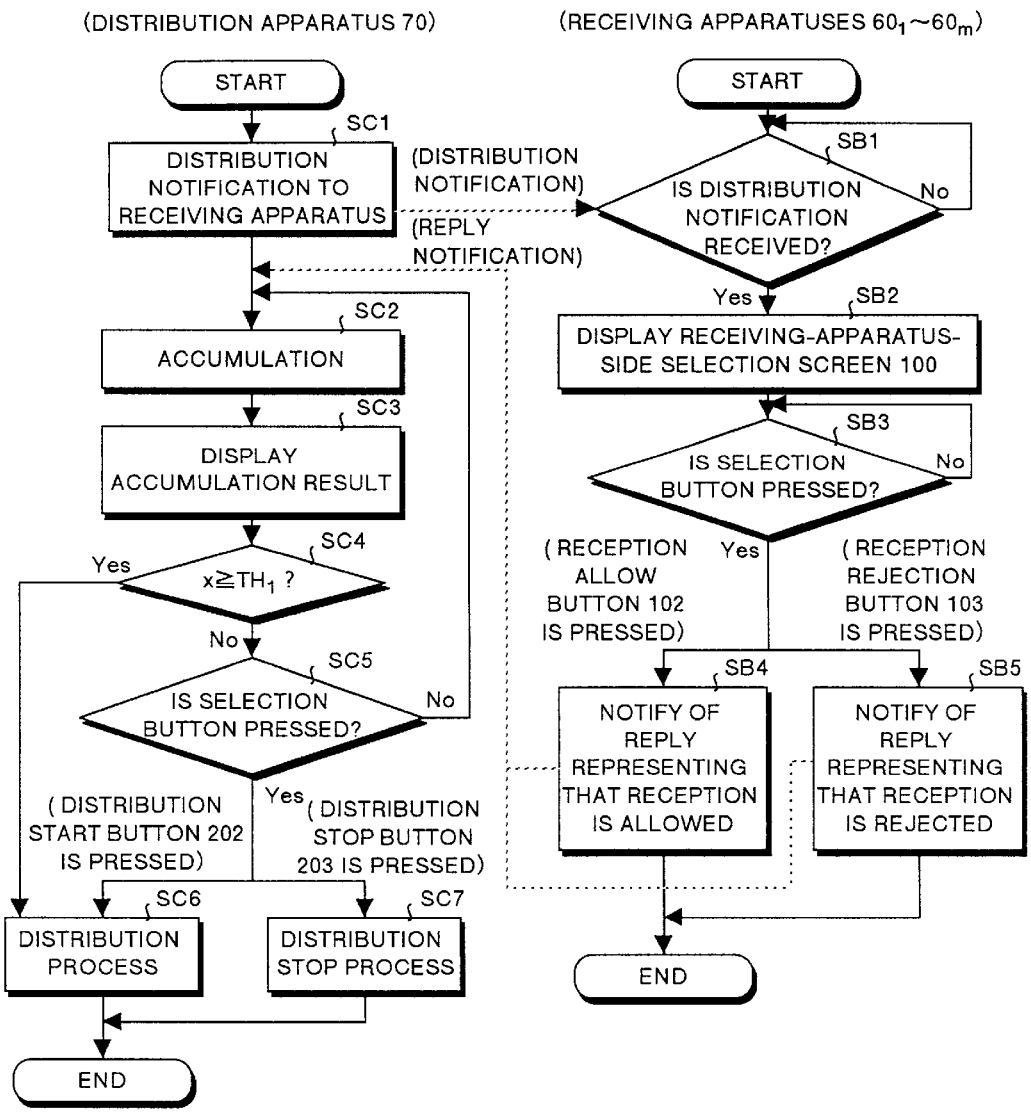
FIG. 8 is a flow chart for explaining Operation Example 1 of the second embodiment.

Operation Example 1 of the second embodiment will be described below with reference to the flow chart shown in FIG. 8. Of steps SC1 to SC7 which are operations on the distribution apparatus 70 side, steps SC1 to SC3 and steps SC5 to SC7 are the same as steps SA1 to SA6 shown in FIG. 4. The operations of the receiving apparatuses $60_1$ to $60_m$ constituted by step SB1 to step SB5 shown in FIG. 8 are the same as those shown in FIG. 4. In Operation Example 1, it is assumed that the distribution start threshold $TH_1$ is set in the accumulation control unit 71 shown in FIG. 7.

In FIG. 6, when the receiving apparatuses $60_1$ to $60_m$ are started, the receiving apparatuses $60_1$ to $60_m$ perform the processing in step SB1 shown in FIG. 8 and decide whether they have received the distribution notifications from the management server 50 (distribution apparatus 70). The decision result here will be "No", and therefore the same decision is repeated. Before a live broadcast is started, when information for making an instruction to transmit a distribution notification is input by a distributor (or another operator) by means of the input unit 35 (see FIG. 7), the distribution control unit 32 performs the processing in step SC1 shown in FIG. 8 to transmit distribution notification instruction information for making an instruction to transmit a distribution notification to the receiving apparatuses $60_1$ to $60_m$ to the management server 50 through the network N. Subsequently, the same operations as those in the first embodiment described above will be performed.

More specifically, when the receiving apparatuses $60_1$ to $60_m$ receive the distribution notifications, the receiving apparatuses $60_1$ to $60_m$ determine the decision result in step SB1 as "Yes" and perform the processing step SB2. In step SB2, the receiving-apparatus-side selection screen 100 (see FIG. 5A) is displayed, in step SB3, the receiving apparatuses $60_1$ to $60_m$ decides whether the selection button (reception allow button 102 or reception rejection button 103) is pressed by a user.

When the reception allow button 102 is pressed by a user, the receiving apparatuses $60_1$ to $60_m$ determine the decision result in step SB3 as "Yes" and perform the processing in step SB4. In step SB4, the receiving apparatuses $60_1$ to $60_m$ transmit reply notifications each representing that reception is allowed to the management server 50 (distribution apparatus 70) to end the series of processes.

On the other hand, when the reception rejection button 103 is pressed by a user, the receiving apparatuses $60_1$ to $60_m$ determine the decision result in step SB3 as "Yes" and perform the processing in step SB5. In step SB5, the receiving apparatuses $60_1$ to $60_m$ transmit reply notifications each representing that reception is rejected to the management server 50 (distribution apparatus 70) to end the series of processes.

When the management server 50 sequentially receives reply notifications from the receiving apparatuses $60_1$ to $60_m$, the management server 50 gives the reply notifications to the distribution apparatus 70 as reply notification information through the network N in the order of reception. In this manner, in step SC2, the accumulation control unit 71 shown in FIG. 7 accumulates the reply notifications and then gives the accumulation result (reception allowed person count x and reception rejecting person count y) to the distribution control unit 32 through a user interface control unit 34.

In this manner, in step SC3, the distribution control unit 32 displays a reception allowed person count x of the accumulation result (reception allowed person count x and reception rejecting person count y) in the recipient count display region 201 shown in FIG. 5B in the same manner as that in step SA3 (see FIG. 4). In the next step SC4, the accumulation control unit 71 compares the present reception allowed person count x with a distribution start threshold $TH_1$ to decide whether the reception allowed person count x is equal to or larger than the distribution start threshold $TH_1$ or not. Because the reception allowed person count x is smaller than the distribution start threshold $TH_1$, the decision result is will be "No".

In the next step SC5, the distribution control unit 32 decides whether a selection button (distribution start button 202 or distribution stop button 203) is pressed by a user. Because the selection button is not pressed, the decision result will be "No". Therefore, accumulation of reply notifications and an accumulation result (reception allowed person count x) are displayed every time a reply notification is received in step SC2 and step SC3 until the decision result in step SC4 becomes "Yes" or until the decision result in step SC5 becomes "Yes".

When the reception allowed person count x is equal to or larger than the distribution start threshold $TH_1$, the accumulation control unit 71 determines the decision result in step SC4 as "Yes", and performs the processing in step SC6. The accumulation control unit 71 automatically executes the distribution process by controlling an encoder unit 31 regardless of the decision of a distributor. More specifically, the distribution process is executed by the distributor without pressing the distribution start button 202.

In this distribution process, as in step SA5 (see FIG. 4), movie data $D_1$ and audio data $D_2$ related to the lecture are captured by the encoder unit 31. The encoder unit 31 encodes and compresses the movie data $D_1$ and the audio data $D_2$ on the basis of parameters such as a stream band to generate the streaming packet $SP_o$. The streaming packet $SP_o$ is distributed to the stream servers $40_1$ to $40_n$ shown in FIG. 6 through the network control unit 33 and the network N. The stream servers $40_1$ to $40_n$ then distribute the streaming packet $SP_o$ as the streaming packets $SP_1$ to $SP_n$ to the receiving apparatuses $60_1$ to $60_m$, respectively.

When the distribution start button 202 is pressed while the decision result in step SC4 is "No", the decision result in step SC5 becomes "Yes", and a distribution process is executed in step SC6. The distribution process executed at this time is caused by the decision of the distributor. On the other hand, when the distribution stop button 203 is pressed while the decision result in step SC4 is "No", the decision result in step SC5 becomes "Yes", and the distribution stop process is executed in step SC7 as in step SA6 (see FIG. 4).

Operation Example 2 of the second embodiment will be described below with reference to the flow chart shown in FIG. 9. The same reference numerals as in FIG. 8 denote the same parts in FIG. 9. Of steps SD1 to SD7 which are operations on the distribution apparatus 70 side, steps SD1 to SD3 and steps SD5 to SD7 are the same as steps SC1 to SC3 and steps SC5 to SC7 shown in FIG. 8. In Operation Example 2, it is assumed that the distribution stop threshold $TH_2$ is set in the accumulation control unit 71 shown in FIG. 7.

Figure 9:
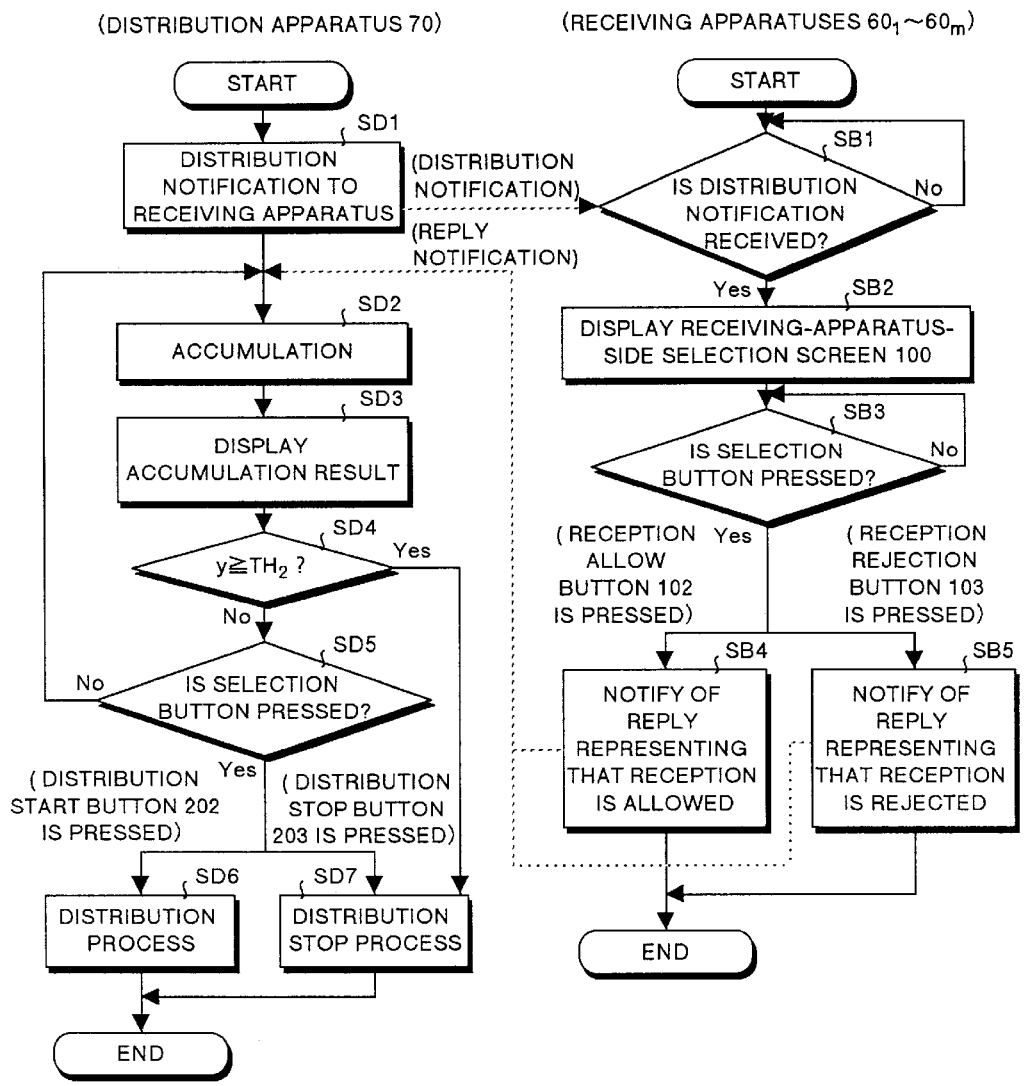
FIG. 9 is a flow chart for explaining Operation Example 2 of the second embodiment.

In FIG. 6, when the receiving apparatuses $60_1$ to $60_m$ are started, the receiving apparatuses $60_1$ to $60_m$ perform the processing in step SB1 shown in FIG. 9 and decide whether they have receives the distribution notifications from the management server 50 (distribution apparatus 70). The decision result here will be "No", and therefore the same decision is repeated. Before a live broadcast is started, when information for making an instruction to transmit a distribution notification is input by a distributor (or another operator) by means of the input unit 35 (see FIG. 7), the distribution control unit 32 performs the processing in step SD1 shown in FIG. 9 and transmit the distribution notification instruction information for making an instruction to transmit distribution notifications to the receiving apparatuses $60_1$ to $60_m$ to the management server 50 through the network N. Subsequently, the same operations as those in the first embodiment described above will be performed.

More specifically, when the receiving apparatuses $60_1$ to $60_m$ receive the distribution notifications, the receiving apparatuses $60_1$ to $60_m$ determine the decision result in step SB1 as "Yes" and execute the process subsequent to step SB2. Here, when the reception allow button 102 is pressed by the user, the above operations are performed, and the receiving apparatuses $60_1$ to $60_m$ transmit the reply notifications each representing that reception is allowed to the management server 50 (distribution apparatus 70) in step SB4 to end the process.

On the other hand, when the reception rejection button 103 is pressed by a user, the above operations are performed, the receiving apparatuses $60_1$ to $60_m$ transmit reply notifications each representing that reception is rejected to the management server 50 (distribution apparatus 70) in step SB5 to end the process.

When the management server 50 sequentially receives reply notifications from the receiving apparatuses $60_1$ to $60_m$, the management server 50 gives the reply notifications to the distribution apparatus 70 as reply notification information through the network N in the order of reception. In this manner, in step SD2, the accumulation control unit 71 shown in FIG. 7 accumulates the reply notifications and then gives the accumulation result (reception allowed person count x and reception rejecting person count y) to the distribution control unit 32 through the user interface control unit 34.

In this manner, in step SD3, as in step SA3 (see FIG. 4), the distribution control unit 32 displays a present reception allowed person count x of the accumulation result (reception allowed person count x and reception rejecting person count y) in the recipient count display region 201 shown in FIG. 5B. In Operation Example 2, the reception rejecting person count y may be displayed in the recipient count display region 201. In the next step SD4, the accumulation control unit 71 compares the reception rejecting person count y with the distribution stop threshold $TH_2$ to decide whether the reception rejecting person count y is equal to or larger than the distribution stop threshold $TH_2$. Because the reception rejecting person count y is smaller than the distribution stop threshold $TH_2$, the decision result will be "No".

In the next step SD5, the distribution control unit 32 decides whether a selection button (distribution start button 202 or distribution stop button 203) is pressed by a user or not. Because the selection button is not pressed, the decision result will be "No". Hence, accumulation of reply notifications and an accumulation result (reception allowed person count x) are displayed every time a reply notification is received in step SD2 and step SD3 until the decision result in step SD4 becomes "Yes" or until the decision result in step SD5 becomes "Yes".

When the reception rejecting person count y is equal to or larger than the distribution stop threshold $TH_2$, the accumulation control unit 71 determines the decision result in step SD4 as "Yes", and performs the processing in step SD7. The accumulation control unit 71 automatically executes the distribution stop process by controlling the encoder unit 31. In this distribution stop process, the accumulation control unit 71 notifies the receiving apparatuses $60_1$ to $60_m$ that the live broadcast (lecture) is stopped through the management server 50. More specifically, the distribution stop process is executed by the distributor without pressing the distribution stop button 203.

When the distribution start button 202 is pressed while the decision result in step SD4 is "No", the decision result in step SD5 becomes "Yes", and a distribution process is executed in step SD6. The distribution process executed at this time is caused by the decision of the distributor. On the other hand, when the distribution stop button 203 is pressed while the decision result in step SD4 is "No", the decision result in step SD5 becomes "Yes", and the distribution stop process is executed in step SD7.

As described above, according to the second embodiment, the accumulation control unit 71 is provided to compare the reception allowed person count x with the distribution start threshold $TH_1$. On the basis of the comparison result, it is decided whether the contents information can be distributed or not. Therefore, distribution of the contents information can be automatically started without the decision of the distributor.

According to the second embodiment, the accumulation control unit 71 is provided to compare the reception rejecting person count y with the distribution stop threshold $TH_2$. On the basis of the comparison result, it is decided whether the contents information can be distributed or not. Therefore, distribution of the contents information can be automatically stopped without the decision of the distributor.

The first and second embodiments described above have exemplified the case in which the length of a waiting time starting from when a distribution notification is transmitted to when a distribution stop process is executed is determined on the basis of the intention of a distributor. However, the waiting time may be compared with a threshold, and the distribution stop process may be performed on the basis of the result. This case will be described below as a third embodiment.

Figure 10:
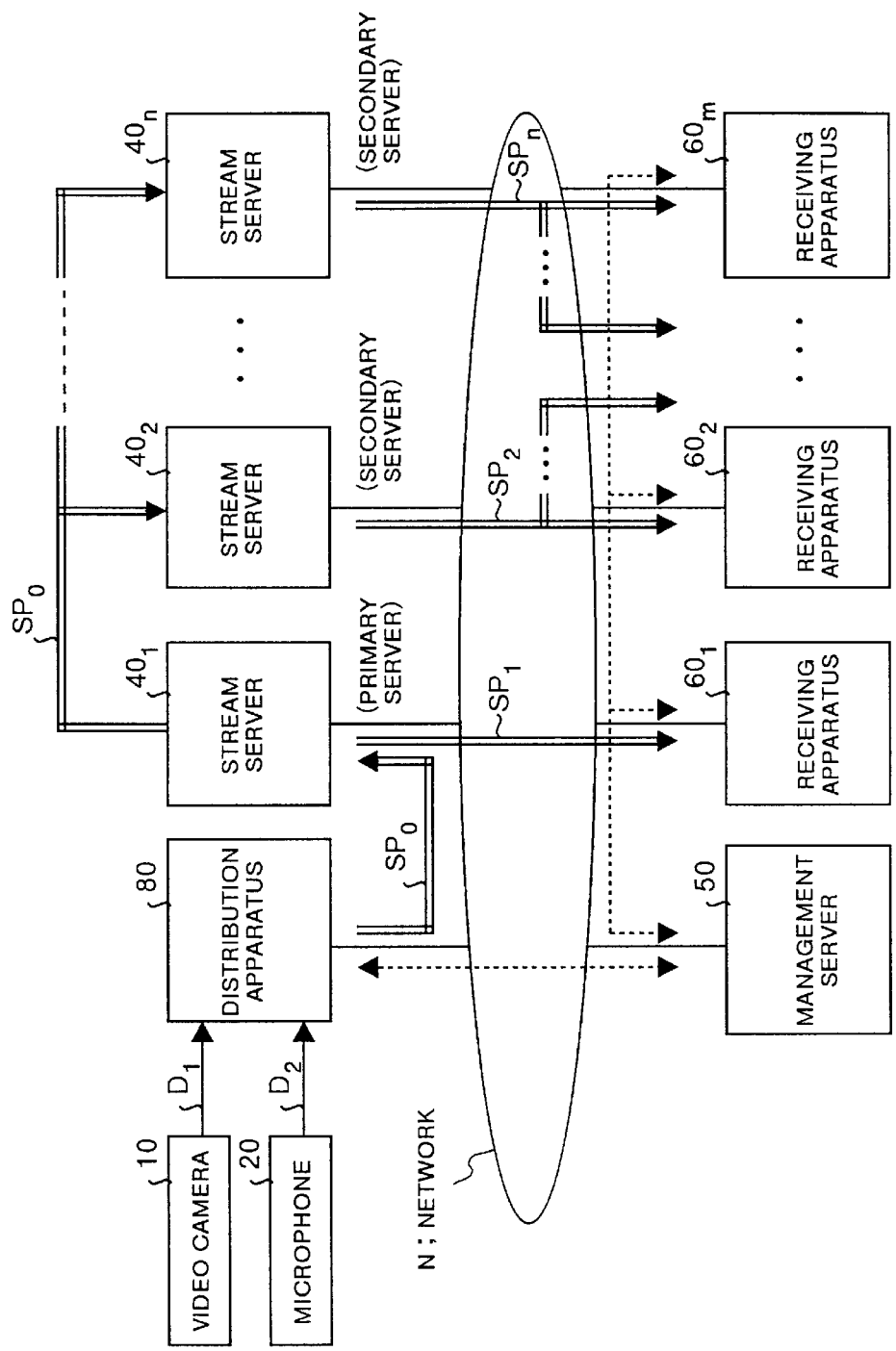
FIG. 10 is a block diagram showing the configuration of a third embodiment according to the present invention.

FIG. 10 is a block diagram showing the configuration of the third embodiment according to the present invention. The same reference numerals as in FIG. 1 denote the same parts in FIG. 10, and a description thereof will be omitted. In FIG. 10, a distribution apparatus 80 is provided in place of the distribution apparatus 30 shown in FIG. 1. The configuration of the distribution apparatus 80 will be described below with reference to FIG. 11.

Figure 11:
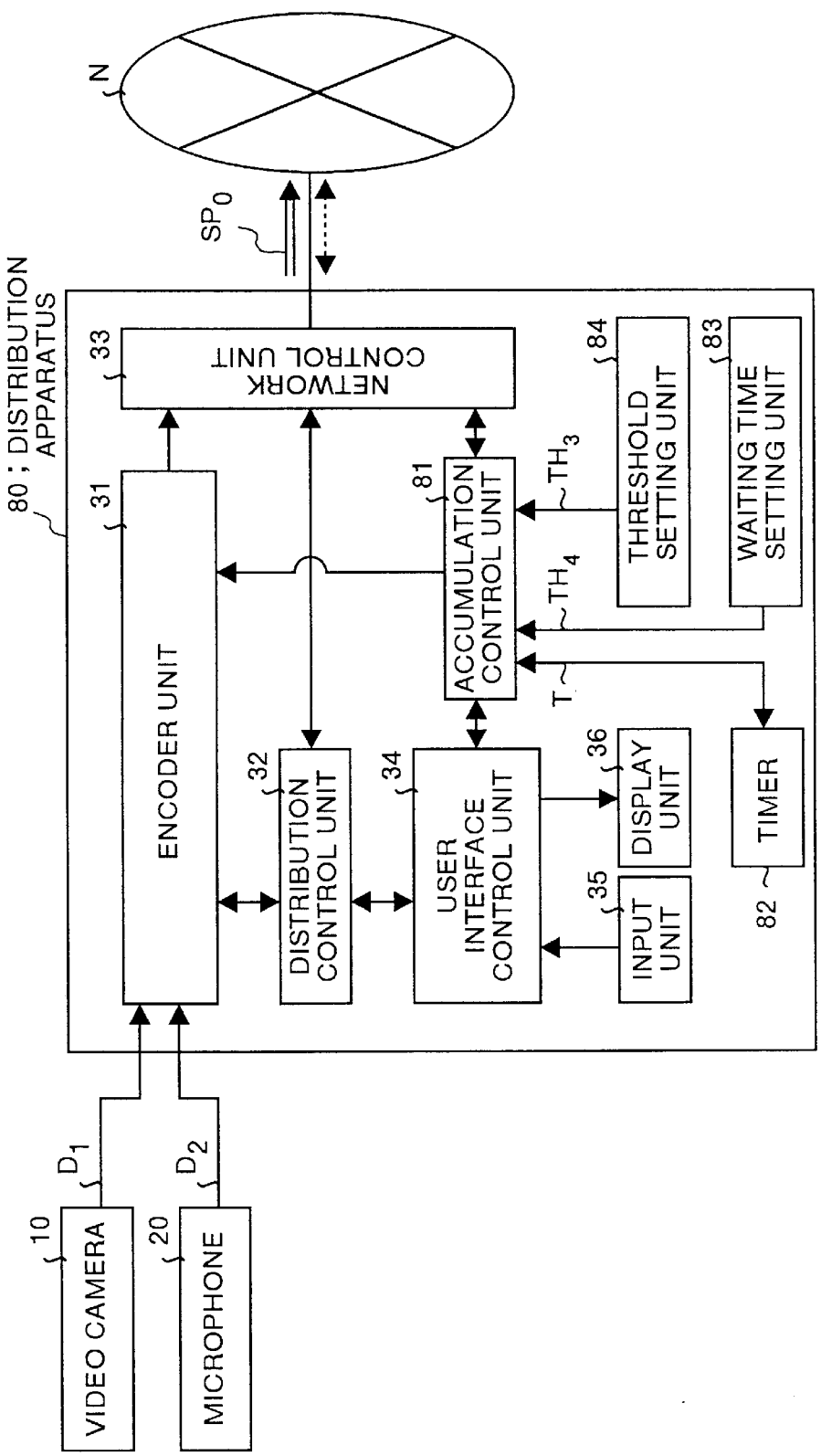
FIG. 11 is a block diagram showing the configuration of a distribution apparatus 80 shown in FIG. 10.

The same reference numerals as in FIG. 2 denote the same parts in FIG. 11, and a description thereof will be omitted. In FIG. 11, an accumulation control unit 81 is newly provided in place of the accumulation control unit 37 shown in FIG. 2, and a timer 82, a waiting time setting unit 83, and a threshold setting unit 84 are newly provided. The basic function of the distribution apparatus 80 is the same as that of the distribution apparatus 30. However, the distribution apparatus 80 is different from the distribution apparatus 30 in that it is decided by using the threshold that a distribution stop process is to be performed or not.

In the distribution apparatus 80, the accumulation control unit 81 accumulates a plurality of relay notifications from the receiving apparatuses $60_1$ to $60_m$ (see FIG. 11) in the same manner as that of the accumulation control unit 37, and gives an accumulation result (reception allowed person count x and reception rejecting person count y) to the distribution control unit 32 through the user interface control unit 34. The timer 82 counts a waiting time starting from when the distribution notification is transmitted, and outputs the count result to the accumulation control unit 81 as a waiting time T. The waiting time setting unit 83 sets a waiting time $TH_4$ in the accumulation control unit 81. The set waiting time $TH_4$ is used as one of decision criteria for checking whether a distribution stop process is executed or not in comparison with the waiting time T.

The threshold setting unit 84 sets a distribution start threshold $TH_3$ in the accumulation control unit 81. The distribution start threshold $TH_3$ is used as one of decision criteria for checking whether a distribution stop process is executed or not in comparison with the reception allowed person count x. Here, the accumulation control unit 81 compares the waiting time T and the set waiting time $TH_4$ with each other and compares the reception allowed person count x and the distribution start threshold $TH_3$ with each other. On the basis of both the comparison results, the accumulation control unit 81 decides whether the distribution stop process is to be executed or not.

The operation of the third embodiment will be described below with reference to the flow chart shown in FIG. 12. The same reference numerals as in FIG. 4 denote the same parts in FIG. 12. In FIG. 10, when the receiving apparatuses $60_1$ to $60_m$ are started, the receiving apparatuses $60_1$ to $60_m$ perform the processing in step SB1 shown in FIG. 12 and decide whether they have received the distribution notifications from the management server 50 (distribution apparatus 80) or not. The decision result will be "No", and therefore the same decision is repeated.

Figure 12:
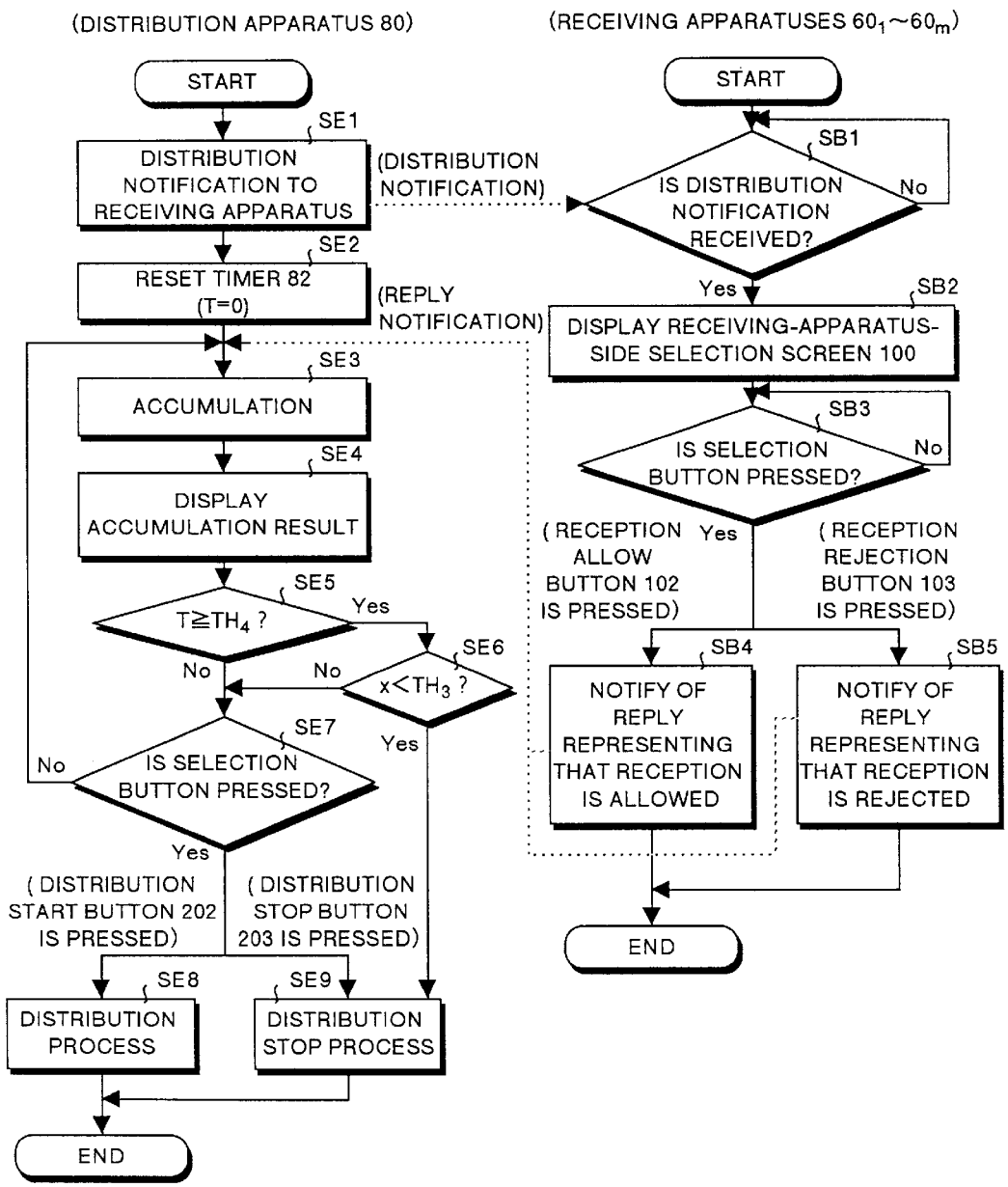
FIG. 12 is a flow chart for explaining the operation of the third embodiment.

Before a live broadcast is started, when information for making an instruction to transmit a distribution notification is input by a distributor (or another operator) by means of the input unit 35 (see FIG. 7), the distribution control unit 32 performs the processing in step SE1 shown in FIG. 12 and transmits the distribution notification instruction information for making an instruction to transmit distribution notifications to the receiving apparatuses $60_1$ to $60_m$ to the management server 50 through the network N. In the next step SE2, the accumulation control unit 81 resets the timer 82 (waiting time T=0). In this manner, the timer 82 starts to measure the time.

When the receiving apparatuses $60_1$ to $60_m$ receive distribution notifications, the receiving apparatuses $60_1$ to $60_m$ determine the decision result in step SB1 as "Yes" and execute the process subsequent to step SB2. Here, when a reception allow button 102 is pressed by a user, the above operations are performed, and the receiving apparatuses $60_1$ to $60_m$ transmit the reply notifications each representing that reception is allowed to the management server 50 (distribution apparatus 80) in step SB4 to end the series of processes.

On the other hand, when the reception rejection button 103 is pressed by a user, the above operations are performed, the receiving apparatuses $60_1$ to $60_m$ transmit the reply notifications each representing that reception is rejected to the management server 50 (distribution apparatus 80) in step SB5 to end the series of processes.

When the management server 50 sequentially receives reply notifications from the receiving apparatuses $60_1$ to $60_m$, the management server 50 gives the reply notifications to the distribution apparatus 80 as reply notification information through the network N in the order of reception. In this manner, in step SE3, the accumulation control unit 81 shown in FIG. 11 accumulates the reply notifications and then gives the accumulation result (reception allowed person count x and reception rejecting person count y) to the distribution control unit 32 through the user interface control unit 34.

In this manner, in step SE4, the distribution control unit 32 displays a present reception allowed person count x of the accumulation result (reception allowed person count x and reception rejecting person count y) in the recipient count display region 201 shown in FIG. 5B. In the third embodiment, the reception rejecting person count y may be displayed in the recipient count display region 201. In the next step SE5, the accumulation control unit 81 compares the waiting time T to the set waiting time $TH_4$ and decides whether the waiting time T is equal to or larger than the set waiting time $TH_4$. Because the waiting time T is smaller than the set waiting time $TH_4$, the decision result will be "No".

In the next step SE7, the distribution control unit 32 decides whether a selection button (distribution start button 202 or distribution stop button 203) is pressed by a user or not as in step SA4 (see FIG. 4). Because the selection button is not pressed, the decision result will be "No". Therefore, subsequently, accumulation of reply notifications and an accumulation result (reception allowed person count x) are displayed every time a reply notification is received.

When the waiting time T is equal to or larger than the set waiting time $TH_4$, the accumulation control unit 81 determines the decision result in step SE5 as "Yes", and performs the processing in step SE6. In step SE6, the accumulation control unit 81 compares the present reception allowed person count x to the distribution start threshold $TH_3$ and decides whether the reception allowed person count x is smaller than the distribution start threshold $TH_3$ or not. If it is determined that the decision result is "Yes", the accumulation control unit 81 performs the processing in step SE9.

When the reception allowed person count x is equal to or larger than the distribution start threshold $TH_3$, the accumulation control unit 81 determines the decision result in step SE6 as "No". More specifically, when the two conditions that the waiting time T starting from when the distribution notification is started is equal to or larger than the set waiting time $TH_4$ and that the reception allowed person count x is smaller than the distribution start threshold $TH_3$ are satisfied, the distribution stop process is executed by the accumulation control unit 81.

In step SE9, the accumulation control unit 81 automatically executes the distribution stop process by controlling an encoder unit 31. In this distribution stop process, the accumulation control unit 81 notifies the receiving apparatuses $60_1$ to $60_m$ that a live broadcast (lecture) is stopped through the management server 50. More specifically, the distribution stop process is executed by a distributor without pressing the distribution stop button 203.

When the distribution start button 202 is pressed while the decision result in step SE5 is "Yes" and also the decision result in step SE6 is "No", the decision result in step SE7 becomes "Yes", and a distribution process is executed in step SE8. The distribution process executed at this time is caused by the decision of a distributor. On the other hand, when the distribution stop button 203 is pressed while the decision result in step SE5 is "Yes" and also the decision result in step SE6 is "No", the decision result in step SE5 becomes "Yes", and the distribution stop process is executed in step SE9.

As described above, according to the third embodiment, the accumulation control unit 81 is provided to compare the waiting time T and the set waiting time $TH_4$ and to compare the reception allowed person count x and the distribution start threshold $TH_3$. On the basis of the two results, it is decided whether contents information is to be distributed or not. For this reason, distribution of the contents information can be automatically stopped without the decision of the distributor when the reception allowed person count x does not reach the distribution start threshold $TH_3$ even after the predetermined waiting time has elapsed.

The first to third embodiments described above have exemplified the case in which distribution notifications to the receiving apparatuses $60_1$ to $60_m$ are transmitted before distribution, and contents information is distributed to the receiving apparatus of a user who allows reception of a live broadcast on the basis of an accumulation result of reply notifications corresponding to the distribution notifications. However, the contents information may be forcefully distributed regardless of whether the users wants the information or not. Such a distribution will be called as emergency distribution and described in detail below as a fourth embodiment.

Figure 13:
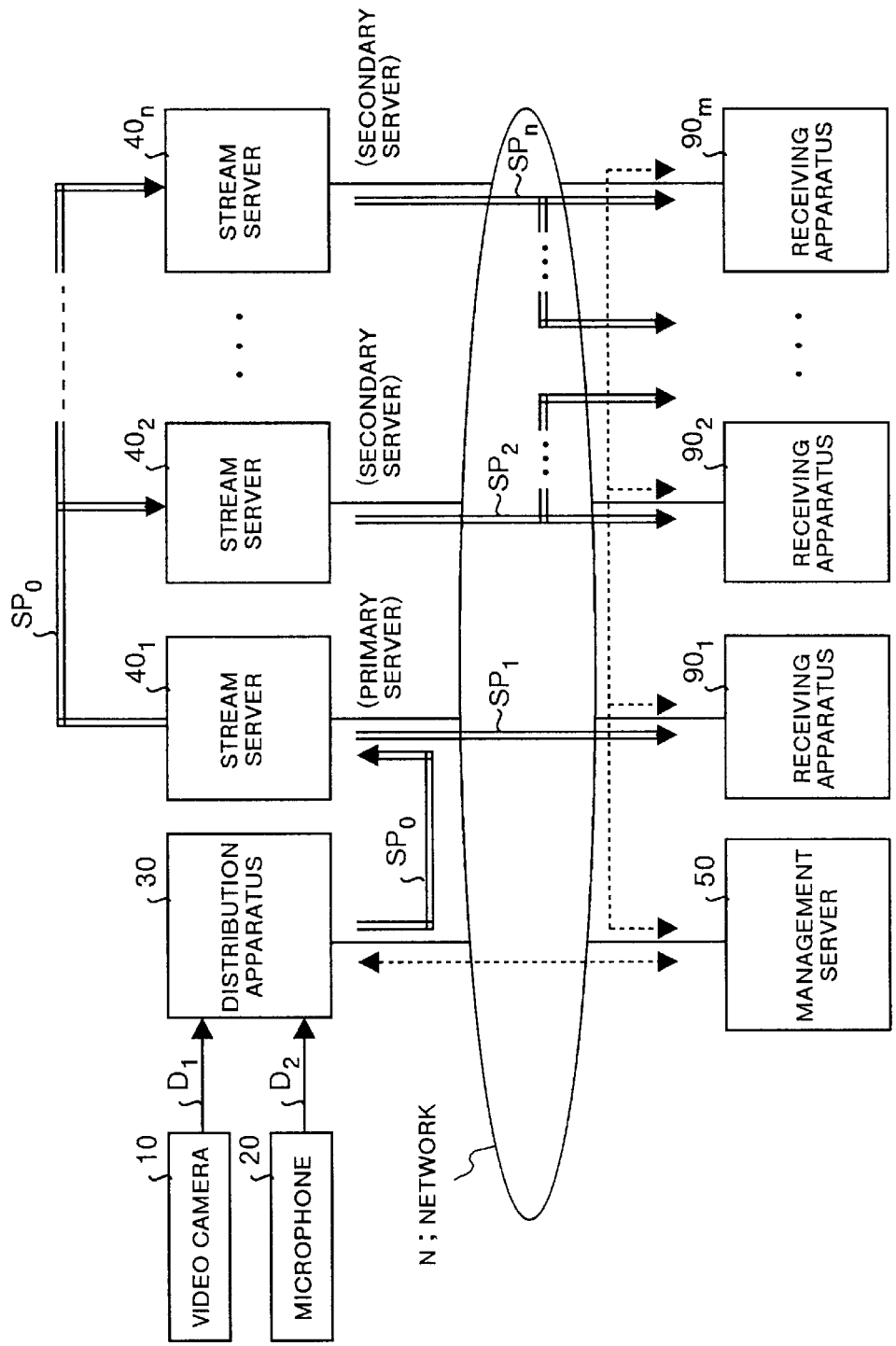
FIG. 13 is a block diagram showing the configuration of a fourth embodiment according to the present invention.

FIG. 13 is a block diagram showing the configuration of the fourth embodiment according to the present invention. The same reference numerals as in FIG. 1 denote the same parts in FIG. 13, and a description thereof will be omitted. In FIG. 13, receiving apparatuses $90_1$ to $90_m$ are provided in place of the receiving apparatuses $60_1$ to $60_m$ shown in FIG. 1.

Figure 14:
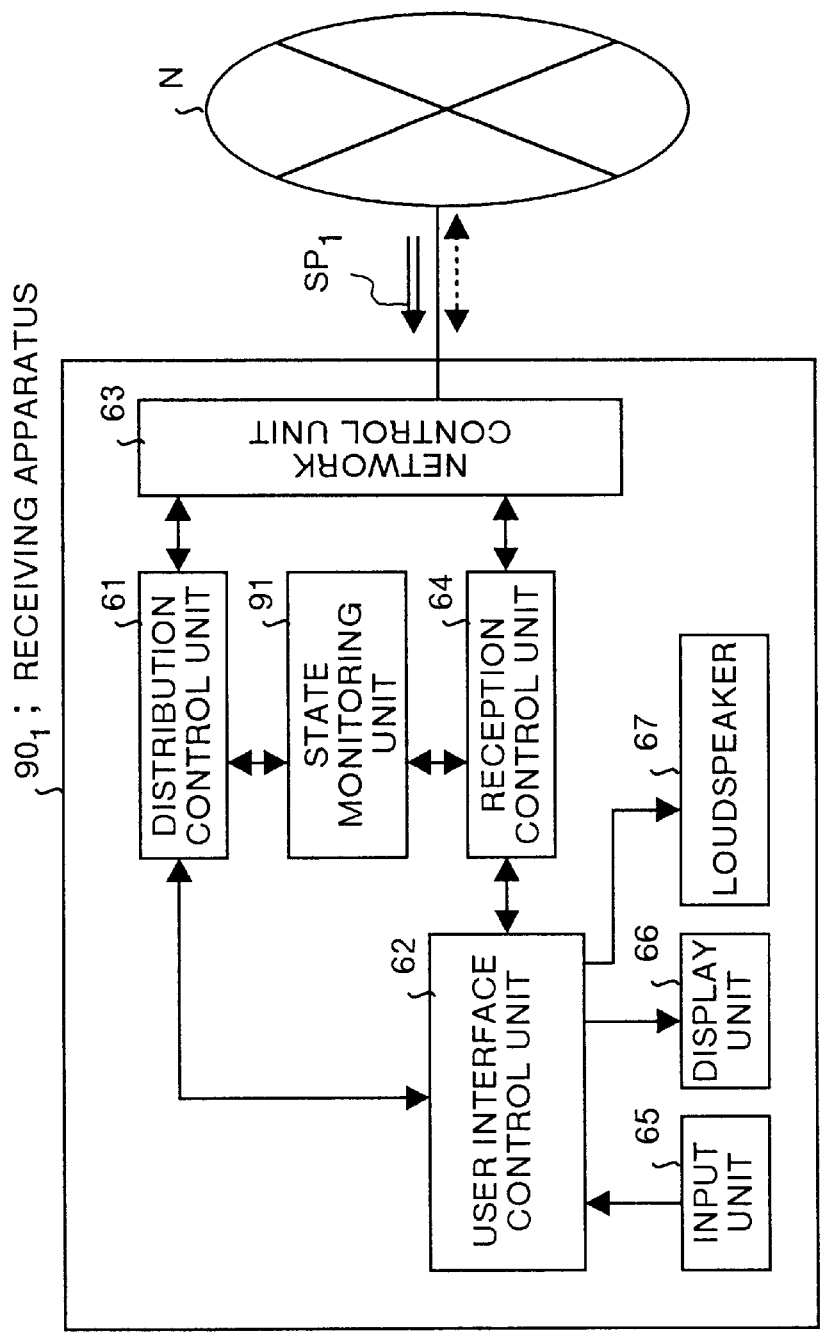
FIG. 14 is a block diagram showing the configuration of a receiving apparatus 90, shown in FIG. 13.

The configuration of the receiving apparatus $90_1$ shown in FIG. 13 will be described below with reference to FIG. 14. The configuration of each of the other receiving apparatuses $90_2$ to $90_m$ is the same as that of the receiving apparatus $90_1$. The same reference numerals as in FIG. 3 denote the same parts in FIG. 14, and a description thereof will be omitted. In FIG. 14, a state monitoring unit 91 is newly provided. This state monitoring unit 91 monitors whether the receiving apparatus $90_1$ is in a state in which the streaming packet $SP_1$ can be received or not, and gives the monitor result to a distribution control unit 61. A receivable state is a state in which the respective parts of the receiving apparatus $90_1$ are normally operating. The distribution control unit 61 notifies a distribution apparatus 30 (management server 50) of a reply representing that the receiving apparatus $90_1$ is receivable (is not receivable) on the basis of the monitor result of the distribution control unit 61.

The operation of the fourth embodiment will be described below with reference to the flow chart shown in FIG. 15. In FIG. 15, the operation on the distribution apparatus 30 side is the same as that shown in FIG. 4. An example in which the circumstances of an emergency lecture is lively broadcast will be described below to explain emergency distribution. In FIG. 13, when the receiving apparatuses $90_1$ to $90_m$ (FIG. 13: distribution control unit 61) are started, the receiving apparatuses $90_1$ to $90_m$ perform the processing in step SF1 shown in FIG. 15 and decide whether they have received the distribution notifications from the management server 50 (distribution apparatus 30). The decision result will be "No", and therefore the same decision is repeated.

Before a live broadcast is started, when information for making an instruction to transmit a distribution notification is input by a distributor (or another operator) by means of the input unit 35 (see FIG. 2), a distribution control unit 32 performs the processing in step SA1 shown in FIG. 15 and transmit the distribution notification instruction information for making an instruction transmit perform distribution notifications to the receiving apparatuses $90_1$ to $90_m$ to the management server 50 through the network N.

When the receiving apparatuses $90_1$ to $90_m$ (distribution control unit 61) receive the distribution notifications, the receiving apparatuses $90_1$ to $90_m$ determine the decision result in step SF1 as "Yes" and performs the processing in step SF2. In step SF2, the receiving apparatuses $90_1$ to $90_m$ (distribution control unit 61) shown in FIG. 13 decide whether the devices are in a receivable state or not on the basis of the monitor result in state monitoring unit 91.

When the receiving apparatuses $90_1$ to $90_m$ are in the receivable state, the receiving apparatuses $90_1$ to $90_m$ (distribution control unit 61) transmit the replay notification each representing the apparatus is receivable to the management server 50 (distribution apparatus 30)and then end the processes. On the other hand, when the apparatuses are not in a receivable state due to a failure of the apparatus or the like, the receiving apparatuses $90_1$ to $90_m$ (distribution control unit 61) transmit the reply notifications each representing that the apparatus is not in a receivable state to the management server 50 (distribution apparatus 30) and then end the process.

When the management server 50 sequentially receives reply notifications from the receiving apparatuses $90_1$ to $90_m$, the management server 50 gives the reply notifications to the distribution apparatus 30 as reply notification information through the network N in the order of reception. In this manner, in step SA2, the accumulation control unit 71 shown in FIG. 7 accumulates the reply notifications and then gives the accumulation result (reception allowed person count x and reception rejecting person count y) to the distribution control unit 32 through the user interface control unit 34. The reception allowed person count x corresponds to the number of receiving apparatuses, which are in receivable state, of the receiving apparatuses $90_1$ to $90_m$, and the reception rejecting person count y corresponds to the number of receiving apparatuses, which are not in a receivable state, of the receiving apparatuses $90_1$ to $90_m$.

In the next step SA3, the distribution control unit 32 displays a present reception allowed person count x of the accumulation result (reception allowed person count x and reception rejecting person count y) in the recipient count display region 201 shown in FIG. 5B and then shifts to the processing in step SA4. In the next step SA4, the distribution control unit 32 decides whether a selection button (distribution start button 202 or distribution stop button 203) is pressed by a user or not. Because the selection button is not pressed, the decision result will be "No". Hence, accumulation of reply notifications and an accumulation result (reception allowed person count x) are displayed every time a reply notification in step SA2 and step SA3 until the decision result in step SA4 becomes "Yes".

When the reception allowed person count x reaches a certain number, the distributor presses the distribution start button 202 by using the input unit 35 and then starts an emergency lecture. In this manner, since the distribution start button 202 is pressed, the distribution control unit 32 determines the decision result in step SA4 as "Yes" and performs the processing in step SA5. In step SA5, the distribution control unit 32 controls the respective parts of the apparatus to perform a distribution process.

In this distribution process, movie data $D_1$ and audio data $D_2$ related to an emergency lecture output from the video camera 10 and the microphone 20 shown in FIG. 2. When the movie data $D_1$ and the audio data $D_2$ are captured by the encoder unit 31, the encoder unit 31 encodes and compresses the movie data $D_1$ and the audio data $D_2$ on the basis of parameters such as a stream band to generate streaming packet $SP_o$.

The streaming packet $SP_o$ is distributed to the stream servers $40_1$ to $40_n$ shown in FIG. 13 through the network control unit 33 and the network N. The stream servers $40_1$ to $40_n$ distribute the streaming packet $SP_o$ as the streaming packets $SP_1$ to $SP_n$ to the receiving apparatuses $90_1$ to $90_m$, respectively. Here, in all the receiving apparatuses, which are in a receivable state, of the receiving apparatuses $90_1$ to $90_m$, contents information related to the emergency lecture is reproduced in real time regardless of the intention of the users.

When the distribution stop button 203 is pressed by the distributor, the distribution control unit 32 determines the decision result in step SA4 as "Yes" and performs the processing in step SA6. In step SA6, the distribution control unit 32 controls the respective parts of the apparatus to perform a distribution stop process.

As described above, according to the fourth embodiment, distribution notifications each of which inquires whether the apparatus is in a condition to receive the contents information (streaming packets $SP_1$ to $SP_n$) or not are transmitted to the plurality of receiving apparatuses $90_1$ to $90_m$, and the distribution of the contents information is started or stopped on the basis of an accumulation result of reply notifications corresponding to the distribution notifications. For this reason, emergency distribution that emergency contents information is distributed to the receiving apparatuses which are in a receivable state can be effectively performed regardless of the intentions of recipients.

The first to fourth embodiments according to the present invention have been described above with reference to the drawings. The concrete configuration is not limited to the first to fourth embodiments, a change in design or the like is included in the present invention without departing from the spirit and scope of the present invention. For example, in the first to fourth embodiments described above, an information distribution program for realizing the above functions may be recorded on a computer readable recording medium 400 shown in FIG. 16, and the information distribution program recorded on the computer readable recording medium 400 may be loaded on a computer 300 shown in FIG. 16 and executed.

Figure 16:
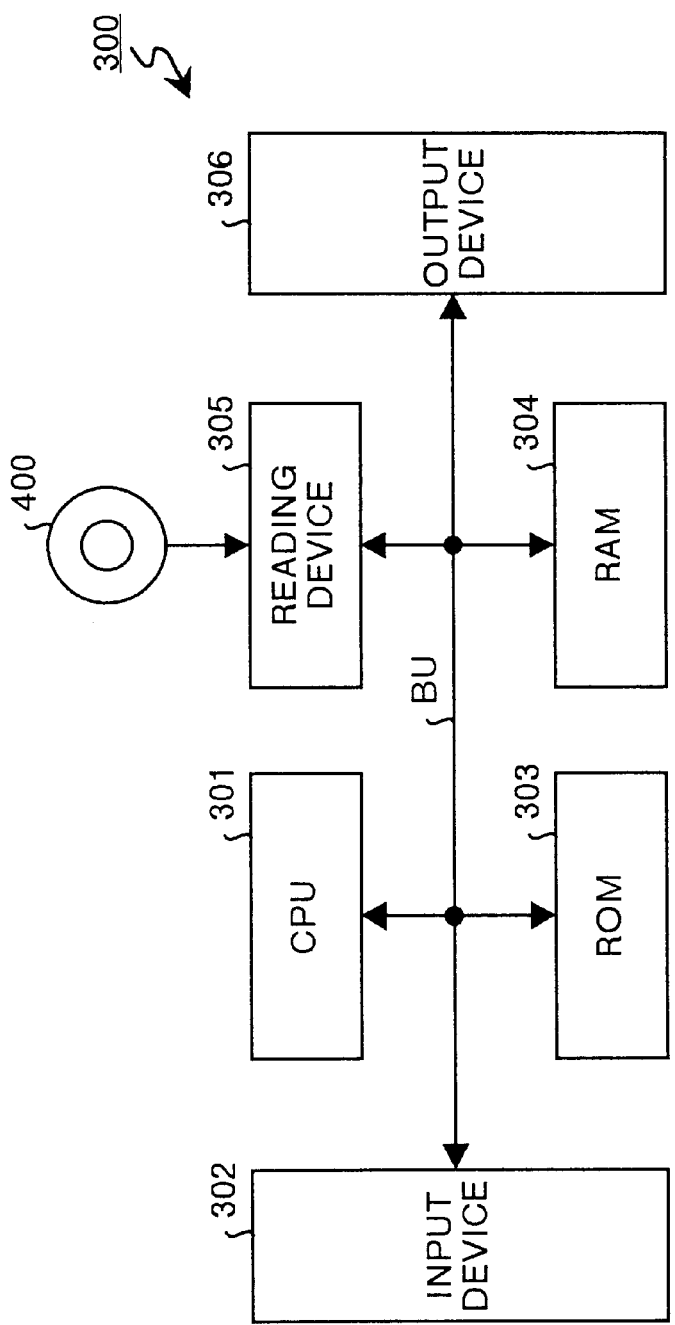
FIG. 16 is a block diagram showing a modification of the first to fourth embodiments according to the present invention.

The computer 300 shown in FIG. 16 is constituted by a CPU 301 for executing the information distribution program, an input device 302 such as a keyboard or a mouse, a ROM (Read Only Memory) 303 for storing various data, a RAM (Random Access Memory) 304 for storing arithmetic operation parameters or the like, a reading device 305 for reading the information distribution program from the computer readable recording medium 400, an output device 306 such as a display or a printer, and a bus BU for connecting the devices to each other.

The CPU 301 loads the information distribution program recorded on the computer readable recording medium 400 through the reading device 305 and then executes the information distribution program to perform distribution of the contents information described above. The computer readable recording medium 400 includes a portable recording medium such as an optical disk, a floppy disk, or a hard disk, and also includes a transmission medium such as a network in which data is temporarily held.

As described above, according to the present invention, the plurality of receiving apparatuses are inquired to decide whether the plurality of receiving apparatuses accept distribution, and the distribution of the information is started or stopped on the basis of the accumulation result of replies corresponding to the inquiry. For this reason, the following advantages can be achieved. That is, the number of recipients (receiving apparatuses) which accept the distribution of the information can be accurately recognized on a distributor side, and the distribution of the information can be effectively performed on the basis of the recognition result.

Further, the accumulation result of the replies are informed by the informing unit. For this reason, the following advantages can be achieved. The number of recipients (receiving apparatuses) which accept distribution can be recognized on the distributor side, and it is decided on the basis of the recognition result whether the distribution is started or stopped.

Further, the comparison unit is provided to compare the number of receiving apparatuses which accept distribution with the distribution start threshold, and it is decided on the basis of the comparison result whether the distribution of the information can be started or not. For this reason, the following advantage can be achieved. That is, the distribution of the information can be automatically started without waiting for the decision of a distributor.

Further, the comparison unit is provided to compare the number of receiving apparatuses which do not receive distribution with the distribution stop threshold, and it is decided on the basis of the comparison result whether the distribution of the information can be stopped or not. For this reason, the following advantage can be achieved. That is, the distribution of the information can be automatically stopped without waiting for the decision of a distributor.

Further, the first comparison unit is provided to compare the waiting time with the preset waiting time, the second comparison unit is provided to compare the number of receiving apparatuses which accept distribution with the distribution start threshold, and it is decided on the basis of the two comparison results whether the distribution of the information can be stopped or not. For this reason, the following advantage can be achieved. That is, distribution of the information can be automatically stopped without the decision of the distributor when the number of receiving apparatuses which accepts distribution does not reach the distribution start threshold even after the predetermined waiting time has elapsed.

Further, the plurality of receiving apparatuses are inquired to decide whether the plurality of receiving apparatuses can receive information, and distribution of the information is started or stopped on the basis of the accumulation result of replies corresponding to the inquiry. For this reason, the following advantage can be achieved. That is, emergency distribution which distributes emergency information to receiving apparatuses which can receive the information can be effectively performed regardless of the intentions of recipients.

Further, in the informing step, the accumulation result of the replies is informed. For this reason, the following advantages can be achieved. The number of recipients (receiving apparatuses) which accept distribution can be accurately recognized on the distribution side, and it can be decided on the basis of the recognition result whether the distribution is started or stopped.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information distribution apparatus that distributes information to an externally provided plurality of receiving apparatuses which are capable of reproducing the information in real time, the information distribution apparatus comprising:

an inquiry unit that inquires each of the plurality of receiving apparatuses as to whether the receiving apparatus accepts the information or not;

an accumulation unit that receives a reply from each of the receiving apparatuses regarding the inquiry and accumulates all replies;

an informing unit that displays the number of replies accumulated in the accumulation unit;

a selection unit capable of selecting start or stop of the distribution of the information, a distribution control unit that starts or stops the distribution of information on the basis of the number of replies accumulated in the accumulation unit, wherein the start of the distribution is decided based on the number of affirmative replies within the accumulated replies and wherein the distribution control unit starts or stops the distribution of the information based on the selection by said selection unit.

2. The information distributing apparatus according to claim 1 further comprising;

a comparison unit that compares the number of affirmative replies from the corresponding receiving apparatuses with a predetermined threshold, wherein the distribution control unit starts the distribution of the information when the comparison by the comparison unit shows that the number of the affirmative replies exceeds the predetermined threshold.

3. The information distributing apparatus according to claim 1 further comprising;

a comparison unit which compares the number of negative replies from the corresponding receiving apparatuses with a predetermined threshold, wherein the distribution control unit stops the distribution of the information when the comparison by the comparison unit shows that the number of the negative replies exceeds the predetermined threshold.

4. The information distributing apparatus according to claim 1 further comprising;

a timer that counts a waiting time which is the elapsed time from when the inquiry is made to the receiving apparatuses;

a first comparison unit that compares the waiting time counted by the timer with a predetermined waiting time; and a second comparison unit that compares the number of affirmative replies from the corresponding receiving apparatuses with a predetermined threshold, wherein the distribution control unit stops distribution of the information when the comparison by the first comparison unit shows that the waiting time exceeds the predetermined waiting time and the comparison by the second comparison unit shows that the number of the affirmative replies from the corresponding receiving apparatuses is less than the predetermined threshold.

5. The information distributing apparatus according to claim 1 further comprising;

a comparison unit that compares the number of affirmative replies from the corresponding receiving apparatuses with a predetermined threshold,
wherein the distribution control unit starts distribution of the information when the comparison by said comparison unit shows that the number of the affirmative replies from the corresponding receiving apparatuses exceeds the predetermined threshold.

6. The information distributing apparatus according to claim 1 further comprising;

a comparison unit that compares the number of negative replies from the corresponding receiving apparatuses with a predetermined threshold,
wherein the distribution control unit stops the distribution of the information when the comparison by the comparison unit shows that the number of the negative replies from the corresponding receiving apparatuses exceeds the predetermined threshold.

7. The information distributing apparatus according to claim 1 further comprising;

a timer that counts a waiting time which is the elapsed time from when the inquiry is made to the receiving apparatuses;
a first comparison unit that compares the waiting time counted by the timer with a predetermined waiting time; and
a second comparison unit that compares the number of affirmative replies from the corresponding receiving apparatuses with a predetermined threshold,
wherein the distribution control unit stops distribution of the information when the comparison by the first comparison unit shows that the waiting time exceeds the predetermined waiting time and the comparison by the second comparison unit shows that the number of the affirmative replies from the corresponding receiving apparatuses is less than the predetermined threshold.

8. An information distribution apparatus that distributes information to an externally provided plurality of receiving apparatuses which are capable of reproducing the information in real time, the information distribution apparatus comprising:

an inquiry unit that inquires each of the plurality of receiving apparatuses as to whether the receiving apparatus is in a position to accept the information or not;
an accumulation unit that receives a reply from each of the receiving apparatuses regarding the inquiry and accumulates all replies; and
a distribution control unit that starts or stops the distribution of information on the basis of the number of replies accumulated in the accumulation unit wherein the distribution unit refrains from the distribution when the number of affirmative replies is less than a predetermined threshold.

9. An information distribution method of distributing an information to externally provided plurality of receiving apparatuses which is capable of reproducing the information in real time, the information distribution method comprising the steps of:

inquiring each of the receiving apparatuses as to whether the receiving apparatus accepts the information or not;
receiving a reply from each of the receiving apparatuses regarding the inquiry made in the inquiring step and accumulating all the replies;
judging whether the number of affirmative answers in the replies exceeds a predetermined threshold or not;
refraining from the distribution of the information when the number of the affirmative answers does not exceed the predetermined threshold; and
starting the distribution of the information when the number of the affirmative answers exceeds the predetermined threshold.

10. A computer readable recording medium that contains a computer program to perform an information distribution to externally provided plurality of receiving apparatuses, wherein the information is capable of being reproduced in real time at the receiving apparatuses, and the computer program includes the steps of:

inquiring to each of the receiving apparatuses as to whether the receiving apparatus accepts the information or not;
receiving a reply from each of the receiving apparatuses regarding the inquiry made in the inquiring step and accumulating all the replies;
judging whether the number of affirmative answers in the replies exceeds a predetermined threshold or not;
refraining form the distribution of the information when the number of the affirmative answers does not exceed the predetermined threshold; and
starting the distribution of the information when the number of the affirmative answers exceeds the predetermined threshold.

11. A computer readable recording medium that contains a computer program to perform an information distribution to externally provided plurality of receiving apparatuses, wherein the information is capable of being reproduced in real time at the receiving apparatuses and the computer program includes the steps of:

inquiring to each of the receiving apparatuses as to whether the receiving apparatus accepts the information or not;
receiving a reply from each of the receiving apparatuses regarding the inquiry made in the inquiring step and accumulating all the replies;
visually displaying the number of replies accumulated in the accumulation step;
judging whether the number of affirmative answers in the replies exceeds a predetermined threshold or not;
selecting start or stop of the distribution of the information using a signal from a switch on the basis of the information in the displaying step;
refraining from the distribution of the information when the stop is selected in the selecting step; and
starting the distribution of the information when the start is selected in the selecting step.

* * * * *